(12) United States Patent
Ushikubo

(10) Patent No.: US 11,204,727 B2
(45) Date of Patent: Dec. 21, 2021

(54) IMAGE PROCESSING APPARATUS AND IMAGE PROCESSING METHOD

(71) Applicant: Oki Electric Industry Co., Ltd., Tokyo (JP)

(72) Inventor: Yuichi Ushikubo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 16/932,769

(22) Filed: Jul. 19, 2020

(65) Prior Publication Data

US 2021/0026584 A1 Jan. 28, 2021

(30) Foreign Application Priority Data

Jul. 22, 2019 (JP) .............................. JP2019-134817

(51) Int. Cl.
*G06F 3/12* (2006.01)

(52) U.S. Cl.
CPC .......... *G06F 3/1255* (2013.01); *G06F 3/1205* (2013.01); *G06F 3/1287* (2013.01); *G06F 3/1292* (2013.01); *G06F 3/1204* (2013.01); *G06F 3/1208* (2013.01)

(58) Field of Classification Search
CPC .... G06F 3/1255; G06F 3/1205; G06F 3/1287; G06F 3/1292; G06F 3/1203; G06F 3/1239; H04N 1/0097; H04N 1/00962; H04N 1/00217; H04N 1/00095; H04N 1/00307; H04N 2201/0094

USPC ....................................................... 358/1.15
See application file for complete search history.

(56) References Cited

U.S. PATENT DOCUMENTS

2019/0246035 A1* 8/2019 Ohshima ............ H04N 1/32106
2020/0310727 A1* 10/2020 Hebbar .............. H04N 1/00204

FOREIGN PATENT DOCUMENTS

JP 2014-89714 A 5/2014

* cited by examiner

*Primary Examiner* — Miya J Williams
*Assistant Examiner* — Darryl V Dottin
(74) *Attorney, Agent, or Firm* — Muncy, Geissler, Olds & Lowe, P.C.

(57) ABSTRACT

An image processing apparatus includes a data processing part that performs image processing of image data, a setting part that sets multiple wireless communication identifiers and functions related to image processing that are respectively associated with the multiple wireless communication identifiers wherein these wireless communication identifies are stored in a storage part, a communication part that establishes a communication with at least one of the external devices using one of the wireless communication identifiers such that the established communication is related to the one of the wireless communication identifiers, wherein the one of the external devices is defined as a connected external device, and the one of the wireless communication identifiers is defined as a related ID, when an image processing job is acquired via the communication part, the control part controls the image processing at the data processing part based on the function associated with the related ID.

16 Claims, 13 Drawing Sheets

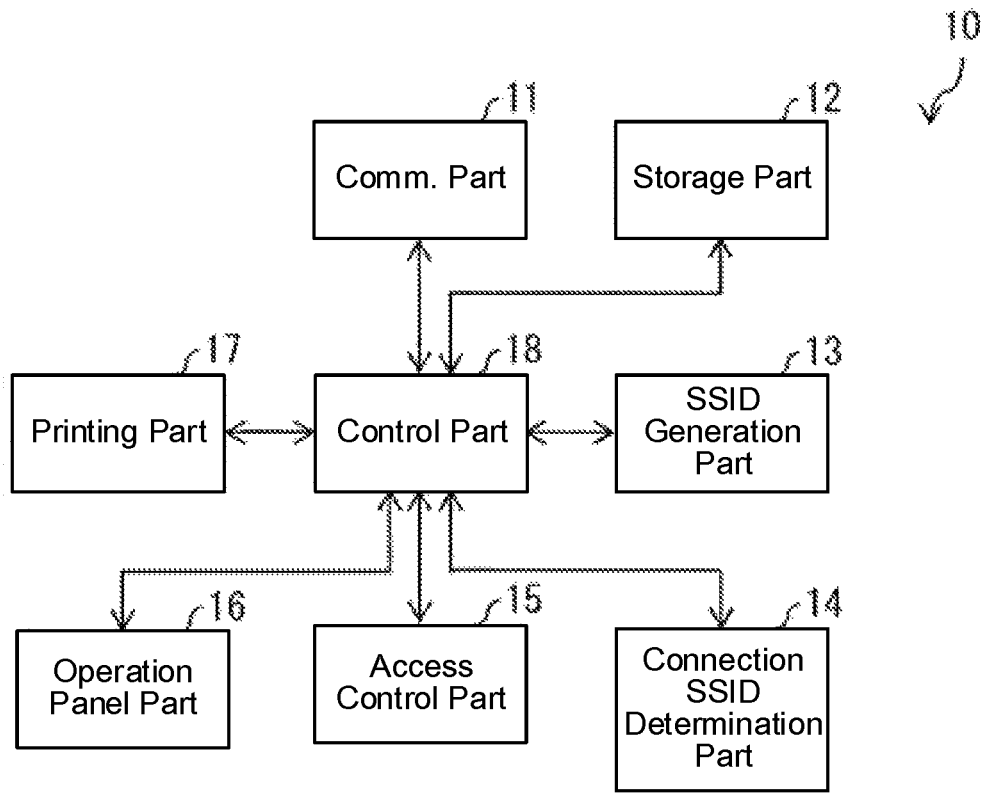

| SSID | | Low Resolution Scanning | Forced Character Recognition Scanning |
|---|---|---|---|
| SSID1 | S123_HiResoOct_AB33CA | NO | YES |
| SSID2 | S123_LoResoNonOct_AB33CA | YES | NO |

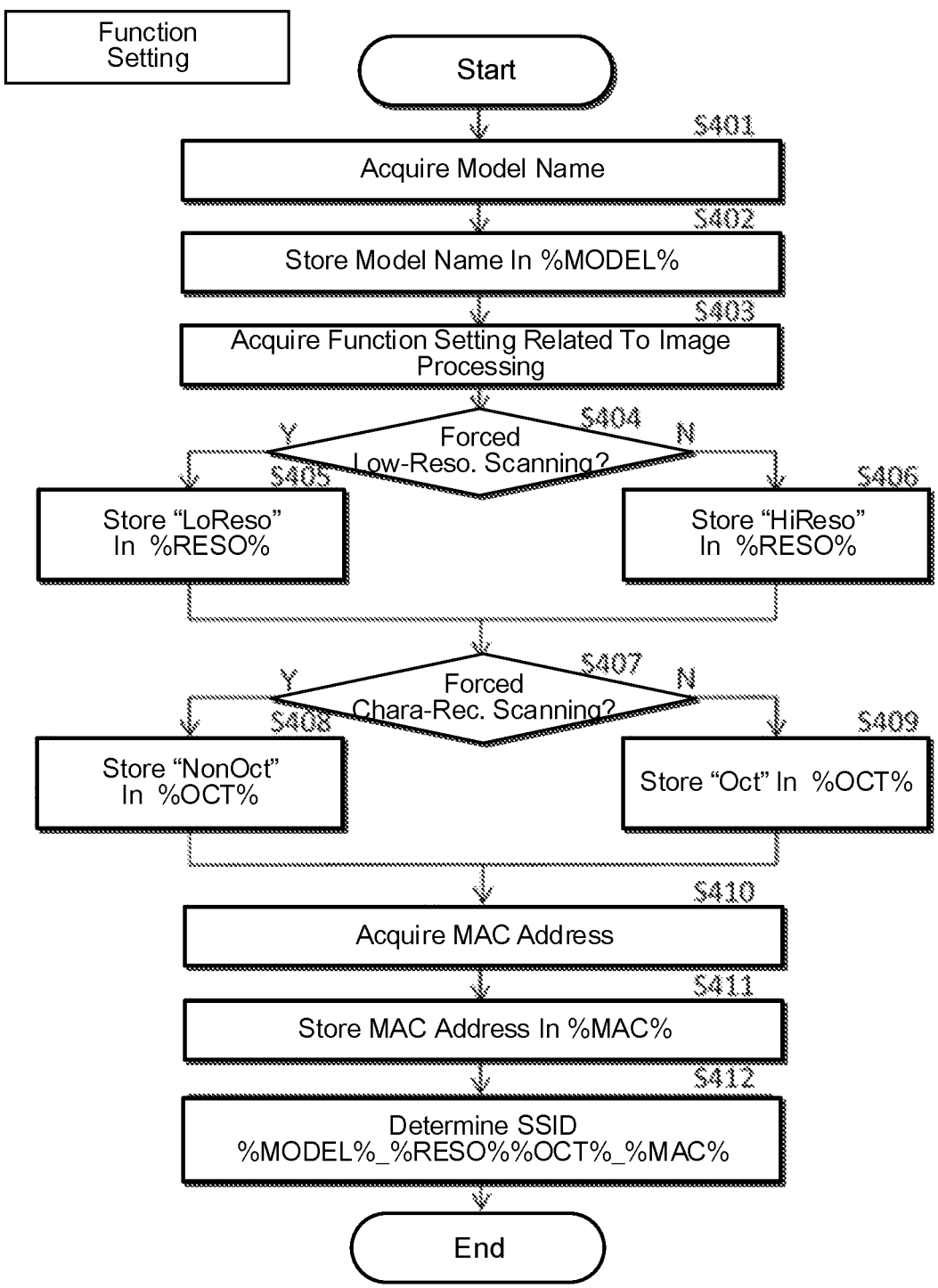

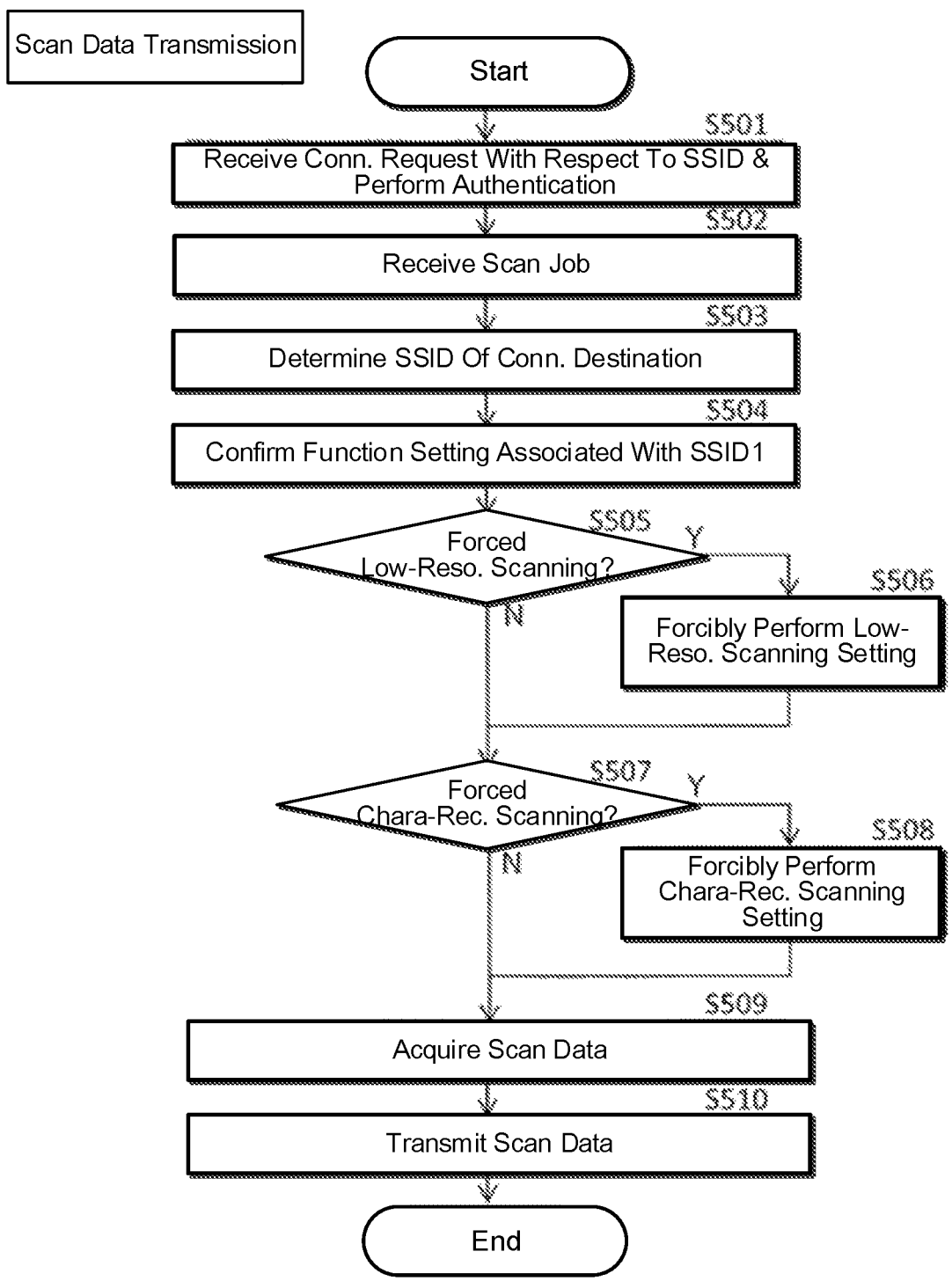

IMAGE PROCESSING APPARATUS AND IMAGE PROCESSING METHOD

TECHNICAL FIELD

The present invention relates to an image processing apparatus and an image processing method.

BACKGROUND

Conventionally, an image processing apparatus, such as a printer, a scanner, a copying machine, a facsimile, or a multifunction machine that integrates functions of these apparatuses, that can receive a job from an external device such as a mobile terminal using a communication function such as Wi-Fi Direct (registered trademark) and can execute copying, printing, scanning, or the like has been on the market. Such an image processing apparatus is disclosed, for example, in Patent Document 1 and the like.

RELATED ART

Patent Doc.

[Patent Doc. 1] JP Laid-Open Patent Publication Application 2014-89714

Subject to be Solved

However, for communication using an external device, it may be desirable to perform a function setting related to a job such as an access restriction (for example, color printing prohibition, forced duplex printing, or the like) or the like. Under such a circumstance, it is desirable to provide an image processing apparatus and an image processing method that allow a function setting related to a job to be easily performed without installing such a dedicated application.

An image processing apparatus, disclosed in the application, includes a data processing part that performs image processing of image data; a setting part that sets multiple wireless communication identifiers and functions related to image processing that are respectively associated with the multiple wireless communication identifiers wherein these wireless communication identifies are stored in a storage part; a communication part that establishes a communication with at least one of the external devices using one of the wireless communication identifiers such that the established communication is related to the one of the wireless communication identifiers, wherein the one of the external devices is defined as a connected external device, and the one of the wireless communication identifiers is defined as a related ID; when an image processing job is acquired via the communication part from the connected external device, the control part controls the image processing at the data processing part based on the function associated with the related ID.

An image processing method, disclosed in the application, includes performing wireless communication using either a first identification name or a second identification name, which is different from the first identification name, as a wireless communication identifier; and when an image processing job is received with the first identification name, performing first image processing with respect to image data transmitted with the image processing job, and when an image processing job is received with the second identification name, performing second image processing, which is different from the first image processing, with respect to image data transmitted with the image processing job.

According to the image processing apparatus and the image processing method as an embodiment of the present invention, a function setting related to a job can be easily performed without installing a dedicated application.

BRIEF DESCRIPTION OF THE DRAWINGS

FIG. 2 illustrates an example of functional blocks of the printer.

FIG. 3 illustrates an example of an access restriction setting table.

FIG. 14 illustrates an example of an operation when a function related to image processing is set.

FIG. 15 illustrates an example of an operation when scan data transmission is performed.

DETAILED DESCRIPTIONS OF THE PREFERRED EMBODIMENTS

Figure 1:
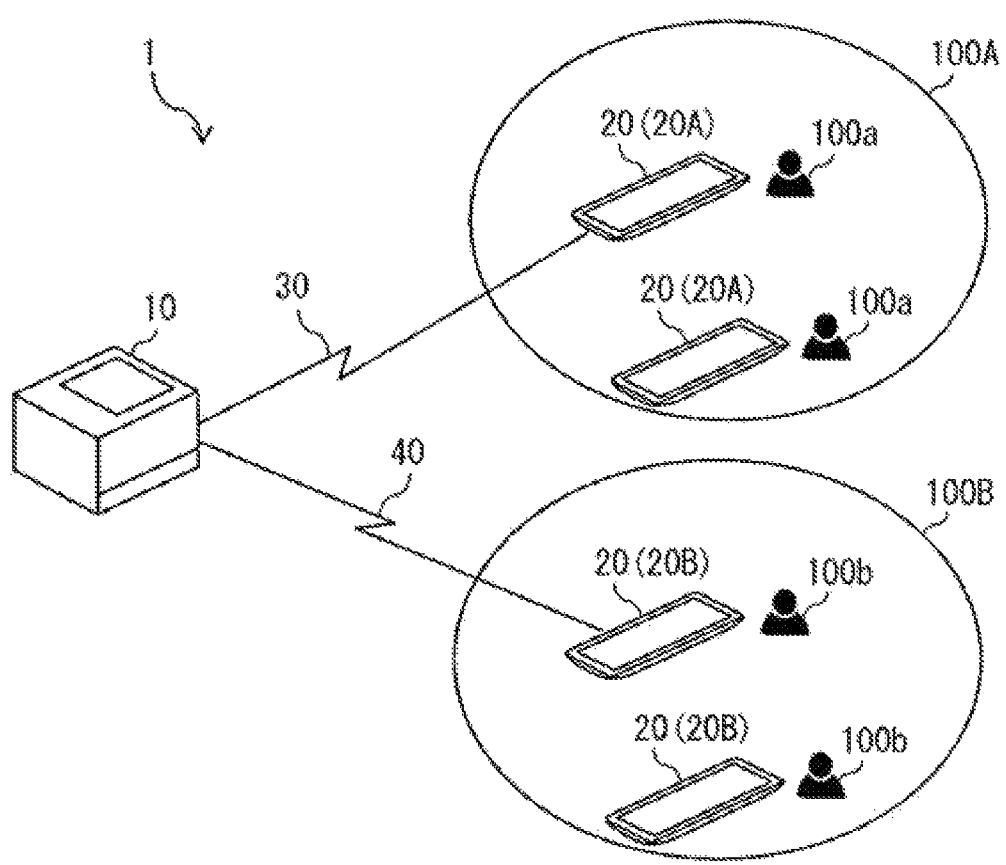
FIG. 1 illustrates a schematic configuration example of an image processing system having a printer according to a first embodiment of the present invention.

In the following, embodiments of the present invention are described with reference to the drawings. The following description is a specific example of the present invention. The present invention is not limited to the following embodiments. Further, the present invention is not limited to arrangements, dimensions, dimension ratios and the like of configuration elements illustrated in the drawings. The description will be given in the following order:
1. First embodiment (image processing system having a printer)
2. Second embodiment (image processing system having a copying machine)
3. Third embodiment (image processing system having a scanner)

1. First Embodiment

[Configuration]

FIG. 1 illustrates a schematic configuration example of an image processing system 1 having a printer 10 according to an embodiment of the present invention. The image processing system 1 includes the printer 10 and multiple mobile terminals 20. The printer 10 corresponds to a specific example of an "image processing apparatus" of the present invention. The mobile terminals 20 each correspond to a specific example of an "external device" of the present invention. The printer 10 and each of the mobile terminals 20 are connected to each other via a network 30 or a network 40. The printer 10 is a Wi-Fi Direct® compatible printing device. The mobile terminals 20 are each a Wi-Fi Direct compatible information processing device such as a Wi-Fi Direct compatible notebook personal computer, tablet terminal or smartphone. Wi-Fi Direct is one of communication methods in which a wireless LAN (Local Area Network) is used, and refers to a function that allows Wi-Fi compatible devices to be directly wirelessly connected to each other without involvement of a wireless LAN router (or an access point).

The network 30 is a network for connecting the printer 10 and a mobile terminal 20 (20A) used by a user 100a belonging to a first group 100A to each other by Wi-Fi Direct. The network 40 is a network for connecting the printer 10 and a mobile terminal 20 (20B) used by a user 100b belonging to a second group 100B to each other by Wi-Fi Direct. Here, the first group 100A and the second group 100B are different from each other in types of printing functions available in the printer 10. The first group 100A is, for example, a group for which no restriction is imposed with respect to the printing functions in the printer 10. On the other hand, the second group 100B is, for example, a group for which restrictions are imposed with respect to the printing functions in the printer 10.

(Printer 10)

FIG. 2 illustrates an example of functional blocks of the printer 10. The printer 10 performs print processing using image data acquired from a mobile terminal 20 via the network 30 or the network 40. The printer 10 includes, for example, a communication part 11, a storage part 12, an SSID generation part 13, a connection SSID determination part 14, an access control part 15, an operation panel part 16, a printing part 17, and a control part 18. The communication part 11 corresponds to a specific example of a "communication part" of the present invention. The SSID generation part 13 and the operation panel part 16 correspond to a specific example of a "setting part" of the present invention. The printing part 17 corresponds to a specific example of a "data processing part" of the present invention. The control part 18 corresponds to a specific example of a "control part" of the present invention.

The communication part 11, the storage part 12, the SSID generation part 13, the connection SSID determination part 14, the access control part 15, the operation panel part 16, the printing part 17 and the control part 18 may be configured using, for example, hardware (circuits). At least some of the SSID generation part 13, the connection SSID determination part 14, the access control part 15 and the control part 18 may be configured using software (programs). In this case, a program for causing a computer to execute a function may be installed in the computer in advance and used, or may be installed in the computer from a network or a recording medium and used.

The communication part 11 is a communication interface that performs communication with one or more mobile terminals 20 by Wi-Fi Direct (that is, via the network 30 or the network 40). The communication part 11 performs communication by Wi-Fi Direct with a mobile terminal 20 with which communication associated with at least one of multiple SSIDs (Service Set Identifiers) described in an access control setting table 13A (to be described later) has been established.

When a connection request with respect to an SSID is received from a mobile terminal 20, the communication part 11 extracts an SSID and a key (password) included in the received connection request, and performs authentication based on the extracted SSID and key (password). The SSID corresponds to a specific example of a "wireless communication identifier" of the present invention. The communication part 11 performs authentication, for example, by collating the extracted SSID and key (password) with authentication information stored in the storage part 12. As a result, when the authentication is successful, the communication part 11 transmits a connection permission as a response to the output connection request to the mobile terminal 20 that made the connection request. In this way, by transmitting the connection permission to the mobile terminal 20, Wi-Fi Direct communication between the communication part 11 and the mobile terminal 20 which is the transmission destination of the connection permission is established. When an image processing job is acquired from a mobile terminal 20 with which communication has been established, the communication part 11 outputs the acquired image processing job to the control part 18. In the present embodiment, an image processing job is a print job that includes image data and an SSID. When a print job is received from a mobile terminal 20 with which communication has been established, the communication part 11 outputs the received print job to the control part 18.

The storage part 12 is configured by, for example, a volatile memory such as a DRAM (Dynamic Random Access Memory), or a nonvolatile memory such as an EEPROM (Electrically Erasable Programmable Read-Only Memory) or a flash memory. The storage part 12 stores an access control setting table 13A generated by the SSID generation part 13. In the access control setting table 13A, for example, as illustrated in FIG. 3, multiple SSIDs, and functions related to image processing that are respectively associated with the multiple SSIDs are set. In the present embodiment, the functions related to image processing are functions related to print processing. The functions related to print processing include, for example, functions of color printing and monochrome printing, functions of duplex printing and simplex printing. The storage part 12 stores, for example, a model name (for example, C841) of the printer 10, a MAC address (for example, 6 characters (FA52DA) from the 4th octet to the 6th octet of the MAC address of the printer 10), print setting information, and the like. The print setting information is information set by default without distinction of a job transmission source, or information set by a user without distinction of a job transmission source. The print setting information includes, for example, information about a sheet size, a tray, a sheet thickness, a print orientation, a print mode (color printing, or monochrome printing), quality (high resolution, medium resolution, or low resolution), layout (duplex printing, or simplex printing), and the like.

In the access control setting table 13A, a character string suggesting a function related to image processing is set for each SSID as a name of the each SSID to be displayed on a mobile terminal 20. A "function related to image processing" is image processing different from cryptic processing of wireless communication, and is image processing performed with respect to unencrypted image data. For example, in the access control setting table 13A, when two SSIDs (SSID1 and SSID2) are set, a character string C841_ColorPrint_FA520A is set for SSID1, and a character string C841_MonoDuplex_FA520A is set for SSID2. "SSID1" and "C841_ColorPrint_FA520A" correspond to a specific example of a "first identification name" of the present invention. "SSID2" and "C841_MonoDuplex_FA520A" correspond to a specific example of a "second identification name" of the present invention.

Further, in the access control setting table 13A, for example, forced monochrome printing (Forced Mono. Printing in FIG. 3) and forced duplex printing are set as functions related to image processing. The forced monochrome printing means that, when print setting information set by default or print setting information set by a user is stored in the storage part 12, regardless of the content of the print setting information, monochrome printing is forcibly set. The forced duplex printing means that, when print setting information set by default or print setting information set by a user is stored in the storage part 12, regardless of the content of the print setting information, duplex printing is forcibly set.

For example, in the access control setting table 13A, when the two SSIDs (SSID1 and SSID2) are set, it is set not to perform forced monochrome printing (for example, "NO") for SSID1, and it is set to perform monochrome printing (for example, "YES") for SSID2. Further, for example, in the access control setting table 13A, when the two SSIDs (SSID1 and SSID2) are set, it is set not to perform forced duplex printing (for example, "NO") for SSID1, and it is set to perform forced duplex printing (for example, "YES") for SSID2.

A character string set for an SSID suggests functions available for the SSID. In the character string (C841_ColorPrint_FA520A) set for SSID1, "C841" is the model name of the printer 10; "Color" means that there is no restriction for monochrome printing (that is, color printing is allowed); "Print" means that there is no restriction for duplex printing (that is, simplex printing is allowed); and "FA520A" are the 6 characters from the 4th octet to the 6th octet of the MAC address of the printer 10. On the other hand, in the character string (C841_MonoDuplex_FA520A) set for SSID2, "C841" is the model name of the printer 10; "Mono" means that there is a restriction for monochrome printing (that is, color printing is not allowed); "Duplex" means that there is a restriction for duplex printing (that is, simplex printing is not allowed); and "FA520A" are the 6 characters from the 4th octet to the 6th octet of the MAC address of the printer 10.

The SSID generation part 13 causes a user to set multiple SSIDs and functions related to image processing that are respectively associated with the multiple SSIDs, and stores the content set by the user in the storage part 12 as an access control setting table 13A. The SSID generation part 13 generates, for example, screen data for causing a user to set multiple SSIDs and functions related to image processing that are respectively associated with the multiple SSIDs, and outputs the screen data to the operation panel part 16. The SSID generation part 13 generates, for example, screen data for causing a user to set a function related to image processing for each SSID and outputs the screen data to the operation panel part 16.

The operation panel part 16 is configured, for example, to include a touch panel, and displays an interface based on the screen data input from the SSID generation part 13 on a screen of the touch panel. Based on the screen data input from the SSID generation part 13, the operation panel part 16 displays, for example, an interface for causing a user to set multiple SSIDs and functions related to image processing that are respectively associated with the multiple SSIDs. Based on the screen data input from the SSID generation part 13, the operation panel part 16 displays, for example, an interface for causing a user to set a function related to image processing for each SSID. That is, the SSID generation part 13 and the operation panel part 16 provide, for each SSID, an interface for causing a user to set multiple SSIDs and functions related to image processing that are respectively associated with the multiple SSIDs.

Figure 4:
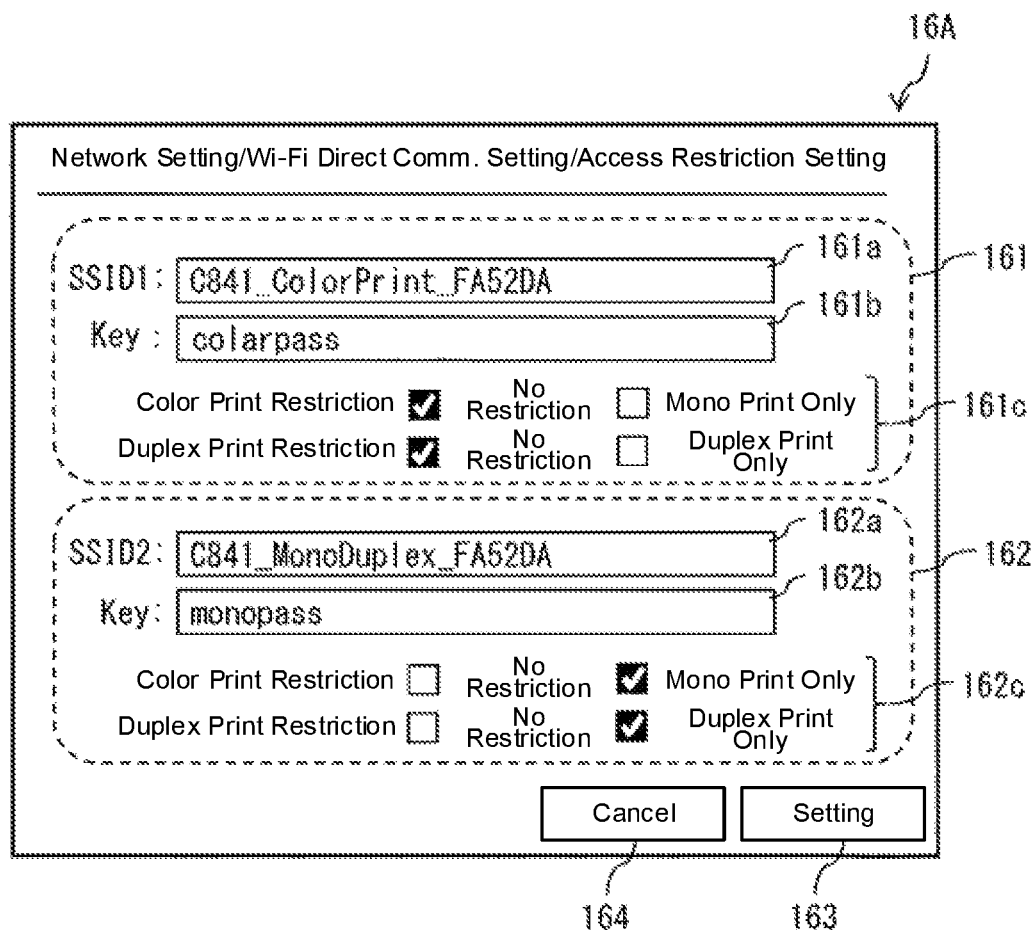
FIG. 4 illustrates an example of a screen when a function related to image processing is set.

Based on the screen data input from SSID generation part 13, the operation panel part 16 displays, for example, a screen 16A (interface) as illustrated in FIG. 4. In the screen 16A, an interface 161 is provided for SSID1 and an interface 162 is provided for SSID2. In the screen 16A, further, a button (setting button 163) for setting an input content and a button (cancel button 164) for canceling an input content are provided.

In the interface 161, for example, a window 161a for inputting a character string of SSID1, a window 161b for inputting a key (password) corresponding to SSID1, and a window 161c for selecting a function related to image processing associated with SSID1 are provided. FIG. 4 illustrates a state in which a character string of SSID1 is input in the window 161a, and a key (password) corresponding to SSID1 is input in the window 161b. Further, FIG. 4 illustrates a state in which, as functions related to image processing, color print restriction and duplex print restriction are described, "No Restriction" is selected for the color print restriction, and "No restriction" is selected for the duplex print restriction.

Similarly, in the interface 162, for example, a window 162a for inputting a character string of SSID2, a window 162b for inputting a key (password) corresponding to SSID2, and a window 162c for selecting a function related to image processing associated with SSID2 are provided. FIG. 4 illustrates a state in which a character string of SSID2 is input in the window 162a, and a key (password) corresponding to SSID2 is input in the window 162b. Further, FIG. 4 illustrates a state in which, as functions related to image processing, color print restriction and duplex print restriction are described, "Monochrome printing only" (Mono Print Only in the drawing) is selected for the color print restriction, and "Duplex printing only" (Duplex Print Only in the drawings) is selected for the duplex print restriction.

The operation panel part 16 outputs to the SSID generation part 13 the content input by the user as settings of the functions in the above interfaces (for example, the interfaces 161, 162). The SSID generation part 13 generates an identifier including a character string corresponding to the content input from the operation panel part 16, and sets the generated identifier as the corresponding SSID.

For example, in the above interfaces (for example, the interfaces 161, 162), when an input that allows processing corresponding to a function related to image processing is made, the SSID generation part 13 may set as the corresponding SSID an identifier including a character string related to the allowed function. Further, for example, in the above interfaces (for example, the interfaces 161, 162), when an input that disallows processing corresponding to a function related to image processing is made, the SSID generation part 13 may set as the corresponding SSID an identifier in which a character string related to the disallowed function is omitted.

In the above interfaces (for example, the windows 161a, 162a of the interfaces 161, 162), when an SSID is manually input by a user, the operation panel part 16 may set as the corresponding SSID a character string input by the user.

The SSID generation part 13 outputs a set SSID to the operation panel part 16. The operation panel part 16 displays the SSID input from the SSID generation part 13 in the window 161a or the window 162a. In this case, the operation panel part 16 may display the SSID in the window 161a or the window 162a in a mode in which the SSID displayed in the window 161a or the window 162a can be modified by a user. The operation panel part 16 may also display the SSID in the window 161a or the window 162a in a mode in which the SSID displayed in the window 161a or the window 162a cannot be modified by a user.

When the setting button 163 is selected by a user, the operation panel part 16 outputs the multiple SSIDs input in the window 161a and the window 162a, the multiple keys (passwords) input in the window 161b and the window 162b, and the functions related to image processing input in the window 161c and the window 162c to the SSID generation part 13. The SSID generation part 13 stores the content input from the operation panel part 16 as an access control setting table 13A in the storage part 12. Specifically, the SSID generation part 13 stores, as an access control setting table 13A in the storage part 12, the multiple SSIDs that are set with the operation panel part 16 and the functions related to image processing that are input with the operation panel part 16 and are respectively associated with the multiple SSIDs. In this way, the SSID generation part 13 and the operation panel part 16 set the multiple SSIDs and the functions related to image processing that are respectively associated with the multiple SSIDs.

The connection SSID determination part 14 analyzes an image processing job input from a mobile terminal 20. When an image processing job is input from the control part 18, the connection SSID determination part 14 extracts an SSID included in the image processing job and outputs the extracted SSID to the access control part 15. For example, when a print job is input from the control part 18, the connection SSID determination part 14 extracts an SSID included in the print job and outputs the extracted SSID to the access control part 15.

The access control part 15 confirms a function setting associated with the SSID input from the connection SSID determination part 14. For example, when an SSID is input from the connection SSID determination part 14, the access control part 15 reads a function setting set for the input SSID from the access control setting table 13A of the storage part 12. The access control part 15 further determines a function setting for the image processing job based on the function setting read from the access control setting table 13A of the storage part 12 and the print setting information read from the storage part 12. For example, the access control part 15 determines a function setting with respect to a print job based on a function setting read from the access control setting table 13A of the storage part 12 and the print setting information read from the storage part 12.

It is assumed that "NO" for forced monochrome printing and "NO" for forced duplex printing are set in the function setting read from the access control setting table 13A of the storage part 12. Further, it is assumed that color printing and duplex printing are set in the print setting information set in the storage part 12. In this case, the access control part 15 may generate a function setting in which color printing is set for the setting of color printing or monochrome printing by giving priority to the print setting information set in the storage part 12, and simplex printing is set for the setting of duplex printing or simplex printing by giving priority to the function setting input from the control part. The access control part 15 may output the function setting generated in this way to the control part 18.

Based on a function setting input from the control part 18, the printing part 17 processes image data input from the control part 18. For example, based on a function setting input from the control part 18, the printing part 17 processes print data input from the control part 18. For example, based on a function setting input from the control part 18, the printing part 17 performs print processing using print data input from the control part 18.

For example, it is assumed that a setting in which "NO" for forced monochrome printing and "NO" for forced duplex printing are set as a function setting is input from the control part 18 to the printing part 17. Further, it is assumed that color printing and duplex printing are set in the print setting information set in the storage part 12. In this case, the printing part 17 may set color printing for the setting of color printing or monochrome printing by giving priority to the print setting information set in the storage part 12, and set simplex printing for the setting of duplex printing or simplex printing by giving priority to the function setting input from the control part, and then perform print processing using print data input from the control part 18.

The printing part 17 generates a print image based on a function setting input from the control part 18 and a print job acquired from a mobile terminal 20 via the communication part 11. The printing part 17 performs print processing using the generated print image.

The control part 18 acquires via the communication part 11 an image processing job from a mobile terminal 20 with which communication has been established. For example, the control part 18 acquires via the communication part 11 a print job from a mobile terminal 20A with which communication has been established.

The control part 18 outputs a received image processing job to the connection SSID determination part 14. The control part 18 acquires from the access control part 15 a function setting associated with an SSID included in an image processing job output to the connection SSID determination part 14 as a response to the image processing job. When an image processing job is a print job containing image data, the control part 18 outputs a received print job to the connection SSID determination part 14. The control part 18 acquires from the access control part 15 a function setting associated with an SSID included in a print job output to the connection SSID determination part 14 as a response to the print job.

The control part 18 outputs to the printing part 17 a function setting acquired from the access control part 15 and an image processing job acquired via the communication part 11 from a mobile terminal 20. For example, the control part 18 outputs to the printing part 17 a function setting acquired from the access control part 15 and a print job acquired via the communication part 11 from a mobile terminal 20.

[Operation]

Next, an example of a function setting related to image processing in the printer 10 is described.

Figure 5:
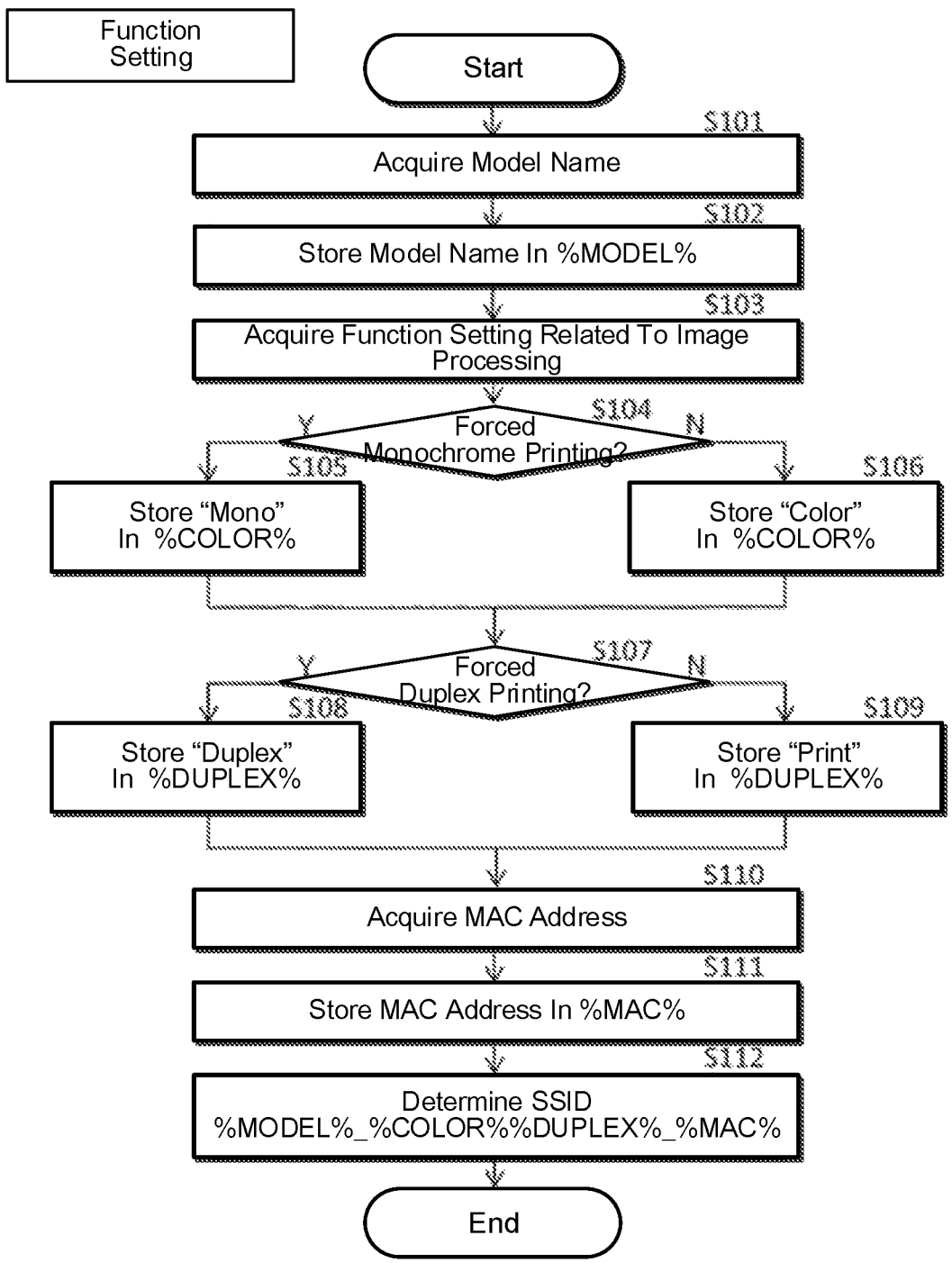
FIG. 5 illustrates an example of an operation when a function related to image processing is set.

FIG. 5 illustrates an example of an operation when a function related to image processing is set. First, a user calls a function setting screen related to image processing via the operation panel part 16. Then, the SSID generation part 13 generates, for example, screen data for causing a user to set multiple SSIDs and functions related to image processing that are respectively associated with the multiple SSIDs, and outputs the screen data to the operation panel part 16. The SSID generation part 13 generates, for example, screen data for causing a user to set a function related to image processing for each SSID and outputs the screen data to the operation panel part 16. For example, based on the screen data input from the SSID generation part 13, the operation panel part 16 displays an interface (function setting screen) for causing a user to set multiple SSIDs and functions related to image processing that are respectively associated with the multiple SSIDs.

Next, the SSID generation part 13 acquires a model name of the printer 10 from the storage part 12 (S101). The SSID generation part 13 temporarily stores the acquired model name in Parameter % MODEL % (S102). In this case, the user inputs processing corresponding to a function related to image processing in the interface (function setting screen). For example, the user inputs functions related to image processing in the windows 161c, 162c of the interfaces 161, 162 that are respectively provided for the SSIDs as illustrated in FIG. 4. For example, as illustrated in FIG. 4, in the window 161c of the interface 161, the user selects "No restriction" for the color print restriction and "No restriction" for the duplex print restriction as a function setting corresponding to SSID1. Further, for example, as illustrated in FIG. 4, in the window 162c of the interface 161, the user selects "Monochrome printing only" for the color print restriction and "Duplex printing only" for the duplex print restriction as a function setting corresponding to SSID2.

Then, the operation panel part 16 acquires the content input by the user as a function setting related to image processing in the above interfaces (for example, the interfaces 161, 162) (S103). The operation panel part 16 outputs the acquired function setting to the SSID generation part 13. The SSID generation part 13 acquires the function setting from the operation panel part 16.

The SSID generation part 13 determines whether or not forced monochrome printing and forced duplex printing are set based on the acquired function setting, and sets the following parameters according to a result of the determination.

For example, the SSID generation part 13 determines whether or not forced monochrome printing is set in a function setting corresponding to SSID1 (S104). For example, when "Monochrome printing only" is set for the color print restriction in a function setting corresponding to SSID2, the SSID generation part 13 temporarily stores "Mono" in Parameter % COLOR % for SSID2 indicating that forced monochrome printing is set in the function setting corresponding to SSID2 (S105). Further, for example, when "No restriction" is set for the color print restriction in a function setting corresponding to SSID1, the SSID generation part 13 temporarily stores "Color" in Parameter % COLOR % for SSID1 indicating that forced monochrome printing is not set (S106).

For example, the SSID generation part 13 determines whether or not forced duplex printing is set in a function setting corresponding to SSID1 (S107). For example, when "Duplex printing only" is set for the duplex print restriction in a function setting corresponding to SSID2, the SSID generation part 13 temporarily stores "Duplex" in Parameter % DUPLEX % for SSID2 indicating that forced duplex printing is set in the function setting corresponding to SSID2 (S108). Further, for example, when "No restriction" is set for the duplex print restriction in a function setting corresponding to SSID1, the SSID generation part 13 temporarily stores "Print" in Parameter % COLOR % for SSID1 indicating that forced duplex printing is not set (S109).

Next, the SSID generation part 13 acquires 6 characters from the 4th octet to the 6th octet of the MAC address of the printer 10 from the storage part 12 (S110). The SSID generation part 13 temporarily stores the acquired MAC address in Parameter % MAC % (S111). Based on the parameters obtained this way, the SSID generation part 13 determines an SSID character string (S112). For example, the SSID generation part 13 applies the temporarily stored character string to a character string (% MODEL %_% COLOR %% DUPLEX %_% MAC %) formed by arranging % MODEL %, "_", % COLOR %, % DUPLEX %, "_", and % MAC % in a row. As a result, for example, the SSID generation part 13 generates C841_ColorPrint_FA520A as a character string corresponding to SSID1 and C841_MonoDuplex_FA520A as a character string corresponding to SSID2. Finally, the user selects the setting button 163. Then, the SSID generation part 13 stores in the storage part 12 an access control setting table 13A in which a character string of an SSID and a function setting corresponding to the SSID are set for each SSID. That is, for example, the SSID generation part 13 sets first image processing (no forced monochrome printing and no forced duplex printing) as a function related to image processing corresponding to SSID1 (C841_ColorPrint_FA520A) and sets second image processing (forced monochrome printing and forced duplex printing) as a function related to image processing corresponding to SSID2 (C841_MonoDuplex_FA520A). In this way, function settings related to image processing are performed. The SSID generation part 13 may also store a key (password) of an SSID in the storage part 12 along with storing an access control setting table 13A in the storage part 12.

Next, an example of an operation when printing is performed in the printer 10 is described.

Figure 6:
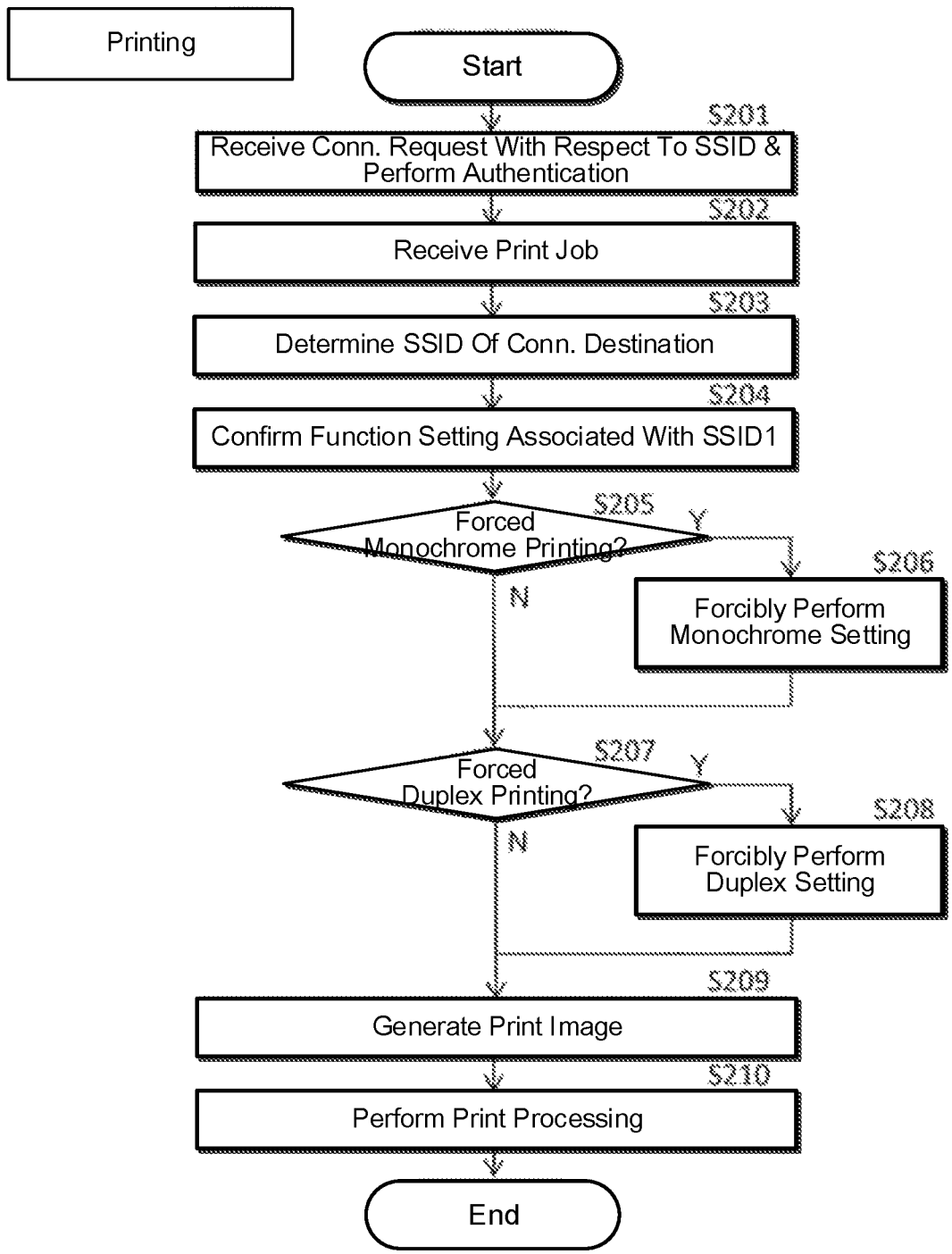
FIG. 6 illustrates an example of an operation when printing is performed.

FIG. 6 illustrates an example of an operation when printing is performed in the printer 10. First, a user 100a opens a Wi-Fi setting screen on a mobile terminal 20A and turns on Wi-Fi. Next, the user 100a selects SSID1 (C841_ColorPrint_FA520A) of the printer 10 from a list in the mobile terminal 20A, and then inputs a key (password) of SSID1 and presses a "Transmit button." Then, the mobile terminal 20A transmits a connection request including SSID1 and the key (password) (that is, a "connection request with respect to SSID1") to the printer 10 via the network 30.

The printer 10 (communication part 11) receives the connection request (Conn. Request in the drawing) with respect to SSID1 from the mobile terminal 20A and performs authentication (S201). For example, when the connection request with respect to SSID1 is received from the mobile terminal 20A, the printer 10 (communication part 11) extracts an SSID and a key (password) included in the received connection request, and performs authentication based on the extracted SSID and key (password). As a result, when the authentication is successful, the communication part 11 may transmit a connection permission as a response to the output connection request to the mobile terminal 20A that made the connection request. In this case, it is also possible that the operation panel part 16 asks the user for a connection permission, and, when the user inputs a connection permission, the communication part 11 transmits the connection permission as a response to the output connection request to the mobile terminal 20A that made the connection request. In this way, by transmitting the connection permission to the mobile terminal 20A, Wi-Fi Direct communication between the communication part 11 and the mobile terminal 20A which is the transmission destination of the connection permission is established.

When the mobile terminal 20A receives the above-described connection permission and establishes Wi-Fi Direct communication with the printer 10 (communication part 11), the user 100a transmits print data to the printer 10 (communication part 11). For example, after the Wi-Fi Direct communication is established, the user 100a launches an application for print data transmission, and uses the launched application to transmit a print job including print data and SSID1 to the printer 10 (communication part 11).

The printer 10 (communication part 11) receives the print job containing the print data via Wi-Fi Direct (that is, via the network 30) (S202). The connection SSID determination part 14 analyzes the print job input from the mobile terminal 20A with which communication has been established. The connection SSID determination part 14 determines an SSID of a connection destination based on the print job (S203). For example, the connection SSID determination part 14 determines the SSID of the connection destination (Conn. Destination in the drawing) by extracting SSID1 included in the print job. For example, the connection SSID determination part 14 outputs the extracted SSID1 to the access control part 15.

The access control part 15 confirms a function setting associated with SSID1 input from the connection SSID determination part 14 (S204). For example, when an SSID is input from the connection SSID determination part 14, the access control part 15 reads a function setting set for the input SSID from the access control setting table 13A of the storage part 12. Further, the access control part 15 determines a function setting with respect to a print job based on a function setting read from the access control setting table 13A of the storage part 12 and the print setting information read from the storage part 12. In the application, the function setting may be referred as function setting information.

The access control part 15 determines whether or not forced monochrome printing is set in the function setting read from the access control setting table 13A (S205). As a result, when forced monochrome printing is set, the access control part 15 forcibly performs a monochrome setting regardless of the print setting information set in the storage part 12 (S206). When forced monochrome printing is not set, the access control part 15 performs setting for color printing or monochrome printing based on the print setting information set in storage part 12.

Further, the access control part 15 determines whether or not forced duplex printing is set in the function setting read from the access control setting table 13A (S207). As a result, when forced duplex printing is set, the access control part 15 forcibly performs a duplex setting regardless of the print setting information set in the storage part 12 (S208). When forced duplex printing is not set, the access control part 15 performs setting for duplex printing or simplex printing based on the print setting information set in storage part 12.

The access control part 15 outputs the function setting generated in this way to the control part 18. The control part 18 outputs to the printing part 17 the function setting acquired from the access control part 15 and the print job acquired via the communication part 11 from the mobile terminal 20A. The printing part 17 generates a print image based on the function setting input from the control part 18 and the print job acquired from the mobile terminal 20A via the communication part 11 (S209). The printing part 17 performs print processing using the generated print image (S210). That is, for example, the printing part 17 performs image processing (no forced monochrome printing and no forced duplex printing) corresponding to SSID1 (C841_ColorPrint_FA520A) with respect to image data, and thereby, outputs an image (first image) corresponding to the image data after the image processing to a sheet of paper of the like. Further, for example, the printing part 17 performs image processing (forced monochrome printing and forced duplex printing) corresponding to SSID2 (C841_MonoDuplex_FA520A) with respect to image data, and thereby, outputs an image (second image having an output result different from that of the first image) corresponding to the image data after the image processing to a sheet of paper of the like. In this way, printing in the printer 10 is performed.

[Effects]

Next, an effect of the printer 10 is described.

Conventionally, an image processing apparatus, such as a printer, a scanner, a copying machine, a facsimile, or a multifunction machine that integrates functions of these apparatuses, that can receive a job from an external device such as a mobile terminal using a communication function such as Wi-Fi Direct and can execute copying, printing, scanning, or the like has been on the market. However, for communication using an external device, it may be desirable to perform a function setting related to a job such as an access restriction (for example, color printing prohibition, forced screen printing, or the like) or the like. In this case, it is necessary to install a dedicated application for performing a function setting related to a job on an external device, and this is complicated.

On the other hand, in the present embodiment, multiple SSIDs and functions related to image processing that are respectively associated with the multiple SSIDs are set in an access control setting table 13A in the storage part 12. As a result, when an image processing job (for example, a print job) is acquired via the communication part 11 from a mobile terminal 20 with which communication has been established, image data (for example, print data) can be processed based on a function related to image processing that is associated with an SSID used to establish the communication. As a result, a function setting related to an image processing job (for example, a print job) can be easily performed for a mobile terminal 20 without installing a dedicated application for performing a function setting related to an image processing job (for example, a print job).

Further, in the present embodiment, interfaces for setting functions related to image processing that are respectively associated with multiple SSIDs are respectively provided for the SSIDs, and, in each of the interfaces, an identifier including a character string corresponding to a content input as a setting of a function related to image processing is set as the corresponding SSID. As a result, from a character string of an SSID, a user can infer a function related to image processing corresponding to the SSID. Further, when a Wi-Fi setting screen is opened on a mobile terminal 20A, available SSIDs for a group to which the user belongs can be easily found from an SSID list.

Further, in the present embodiment, in each of the interfaces, when an input that allows processing corresponding to a function related to image processing is made, an identifier including a character string related to the function is set as the corresponding SSID, and when an input that disallows processing corresponding to a function related to image processing is made, an identifier in which a character string related to the function related to image processing is omitted is set as the corresponding SSID. As a result, from a character string of an SSID, a user can infer a function related to image processing corresponding to the SSID. Further, when a Wi-Fi setting screen is opened on a mobile terminal 20A, available SSIDs for a group to which the user belongs can be easily found from an SSID list.

Further, in the present embodiment, an interface for setting a function related to image processing and an SSID is provided for each SSID, and a character string input as a setting of an SSID is set as the corresponding SSID in each interface. As a result, a user can select a character string that is easy for the user to identify as a character string of an SSID. Therefore, when a Wi-Fi setting screen is opened on a mobile terminal 20A, available SSIDs for a group to which the user belongs can be easily found from an SSID list.

Further, in the present embodiment, when a print job containing image data is acquired as an image processing job via the communication part 11, the image data and a function setting related to image processing are output from the control part 18 to the printing part 17. As a result, based on the function setting input from the control part 18, print processing using the image data can be performed. As a result, even when a print job does not include a function setting related to image processing, for example, print processing based on a function setting corresponding to a group of the transmission source of the print job can be performed.

2. Second Embodiment

[Configuration]

Figure 7:
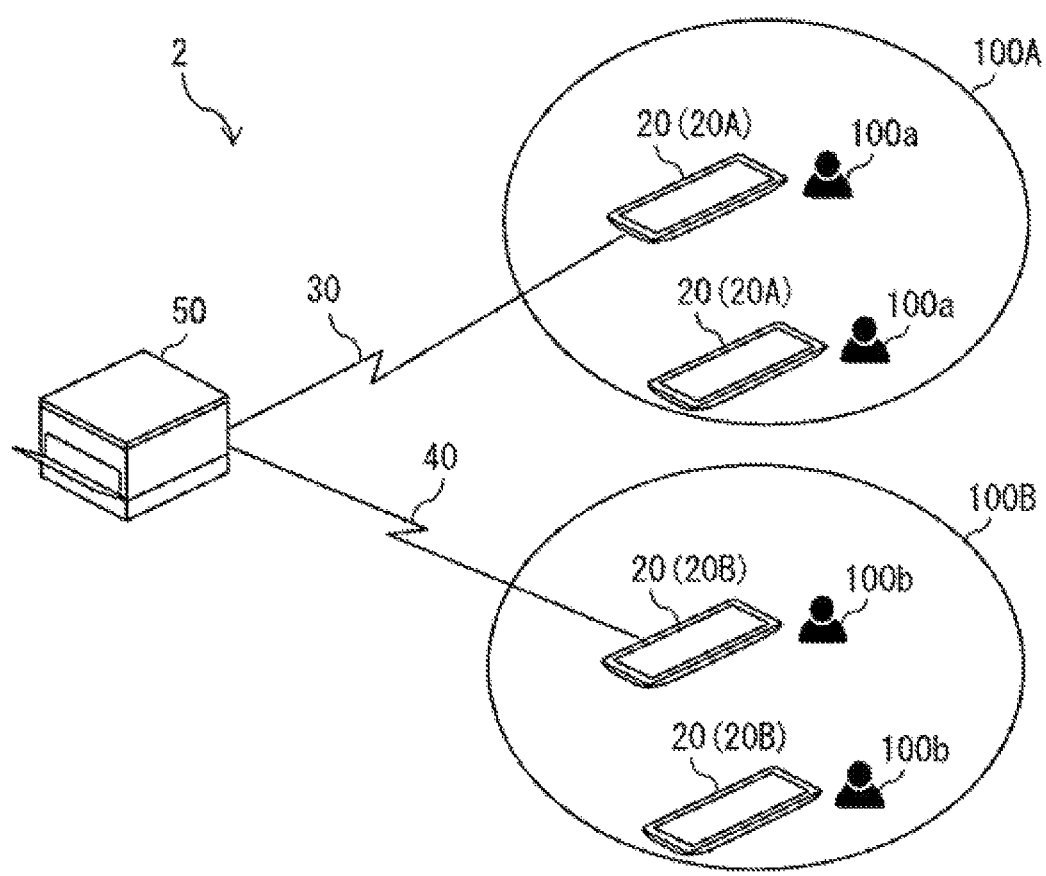
FIG. 7 illustrates a schematic configuration example of an image processing system having a copying machine according to a second embodiment of the present invention.

FIG. 7 illustrates a schematic configuration example of an image processing system 2 having a copying machine 50 according to an embodiment of the present invention. The image processing system 2 includes the copying machine 50 and multiple mobile terminals 20. The copying machine 50 corresponds to a specific example of an "image processing apparatus" of the present invention. The copying machine 50 and each of the mobile terminals 20 are connected to each other via a network 30 or a network 40. The copying machine 50 is a Wi-Fi Direct compatible printing device.

The network 30 is a network for connecting the copying machine 50 and a mobile terminal 20 (20A) used by a user 100a belonging to a first group 100A to each other by Wi-Fi Direct. The network 40 is a network for connecting the copying machine 50 and a mobile terminal 20 (20B) used by a user 100b belonging to a second group 100B to each other by Wi-Fi Direct. Here, the first group 100A and the second group 100B are different from each other in types of printing functions available in the copying machine 50. The first group 100A is, for example, a group for which no restriction is imposed with respect to the printing functions in the copying machine 50. On the other hand, the second group 100B is, for example, a group for which restrictions are imposed with respect to the printing functions in the copying machine 50.

(Copying Machine 50)

Figure 8:
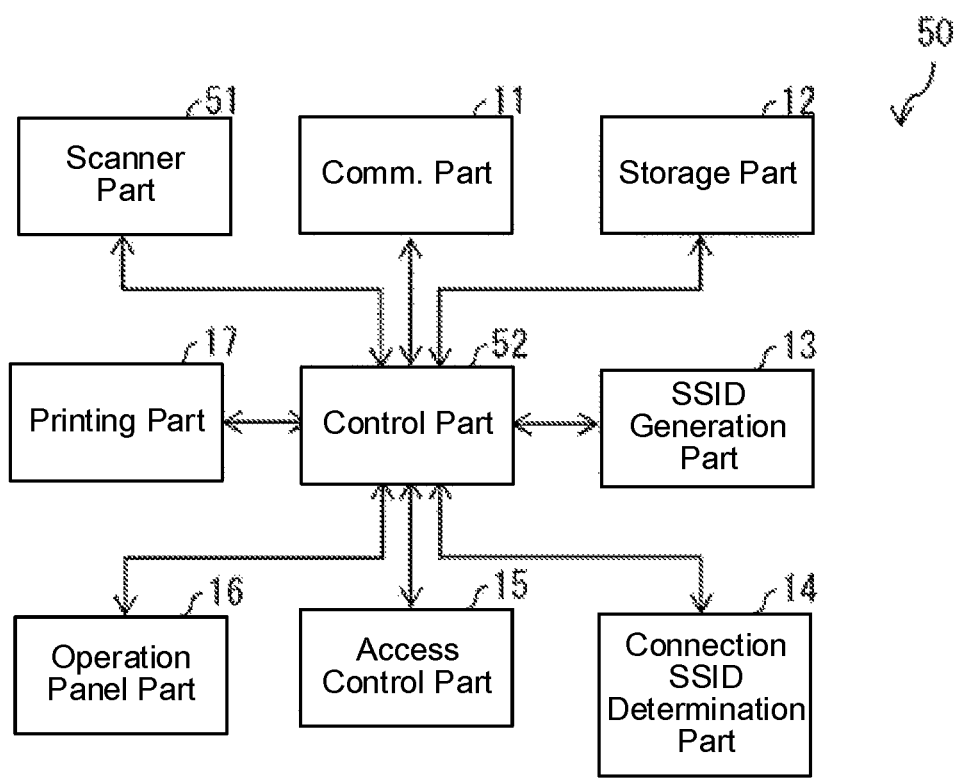
FIG. 8 illustrates an example of functional blocks of the copying machine.

FIG. 8 illustrates an example of functional blocks of the copying machine 50. The copying machine 50 performs print processing using image data acquired by a scanner part 51. The copying machine 50 includes, for example, a communication part 11, a storage part 12, an SSID generation part 13, a connection SSID determination part 14, an access control part 15, an operation panel part 16, a printing part 17, the scanner part 51 and a control part 52. The scanner part 51 corresponds to a specific example of an "imaging part" of the present invention. The control part 52 corresponds to a specific example of a "control part" of the present invention. In the following, a configuration that is the same as in the above embodiment is denoted using the same reference numeral symbol as in the above embodiment. Further, in the following, description about a configuration that is the same as in the above embodiment is omitted as appropriate.

The communication part 11, the storage part 12, the SSID generation part 13, the connection SSID determination part 14, the access control part 15, the operation panel part 16, the printing part 17, the scanner part 51 and the control part 52 may be configured using, for example, hardware (circuits). At least some of the SSID generation part 13, the connection SSID determination part 14, the access control part 15 and the control part 52 may be configured using software (programs). In this case, a program for causing a computer to execute a function may be installed in the computer in advance and used, or may be installed in the computer from a network or a recording medium and used.

In the present embodiment, when an image processing job is acquired from a mobile terminal 20 with which communication has been established, the communication part 11 outputs the acquired image processing job to the control part 52. In the present embodiment, an image processing job is a copy job that includes an SSID. When a copy job is acquired from a mobile terminal 20 with which communication has been established, the communication part 11 outputs the acquired copy job to the control part 52.

In the present embodiment, the storage part 12 stores an access control setting table 13A generated by the SSID generation part 13. The storage part 12 stores, for example, a model name (for example, C841) of the copying machine 50, a MAC address (for example, 6 characters (FA52DA) from the 4th octet to the 6th octet of a MAC address of the copying machine 50), print setting information, and the like.

In the present embodiment, a character string set for an SSID suggests functions available for the SSID. In a character string (C841_ColorPrint_FA520A) set for SSID1, "C841" is a model name of the copying machine 50; "Color" means that there is no restriction for monochrome printing (that is, color printing is allowed); "Print" means that there is no restriction for duplex printing (that is, simplex printing is allowed); and "FA520A" are 6 characters from the 4th octet to the 6th octet of a MAC address of the copying machine 50. On the other hand, in a character string (C841_MonoDuplex_FA520A) set for SSID2, "C841" is the model name of the copying machine 50; "Mono" means that there is a restriction for monochrome printing (that is, color printing is not allowed); "Duplex" means that there is a restriction for duplex printing (that is, simplex printing is not allowed); and "FA520A" are the 6 characters from the 4th octet to the 6th octet of the MAC address of the copying machine 50.

In the present embodiment, based on a function setting input from the control part 52, the printing part 17 processes image data input from the control part 52. For example, based on a function setting input from the control part 52, the printing part 17 processes image data obtained by the scanner part 51. For example, based on a function setting input from the control part 52, the printing part 17 performs print processing using the image data obtained by the scanner part 51.

In the present embodiment, for example, it is assumed that a setting in which "NO" for forced monochrome printing and "NO" for forced duplex printing are set as a function setting is input from the control part 52 to the printing part 17. Further, it is assumed that color printing and duplex printing are set in the print setting information set in the storage part 12. In this case, the printing part 17 may set color printing for the setting of color printing or monochrome printing by giving priority to the print setting information set in the storage part 12, and set simplex printing for the setting of duplex printing or simplex printing by giving priority to the function setting input from the control part, and then perform print processing using image data obtained by the scanner part 51.

In the present embodiment, based on a function setting input from the control part 52 and image data obtained by the scanner part 51, the printing part 17 generates a print image. The printing part 17 performs print processing using the generated print image.

The control part 52 acquires via the communication part 11 an image processing job from a mobile terminal 20 with which communication has been established. For example, the control part 52 acquires via the communication part 11 a copy job from a mobile terminal 20 with which communication has been established.

The control part 52 outputs a received image processing job to the connection SSID determination part 14. The control part 52 acquires from the access control part 15 a function setting associated with an SSID included in an image processing job output to the connection SSID determination part 14 as a response to the image processing job. For example, the control part 52 outputs a received copy job to the connection SSID determination part 14. For example, the control part 52 acquires from the access control part 15 a function setting associated with an SSID included in a copy job output to the connection SSID determination part 14 as a response to the copy job.

The control part 52 outputs to the printing part 17 a function setting acquired from the access control part 15, an image processing job acquired via the communication part 11 from a mobile terminal 20, and image data obtained by the scanner part 51. For example, the control part 52 outputs to the printing part 17 a function setting acquired from the access control part 15, a copy job acquired via the communication part 11 from a mobile terminal 20, and image data obtained by the scanner part 51.

[Operation]

Next, an example of an operation when printing is performed in the copying machine 50 is described.

Figure 9:
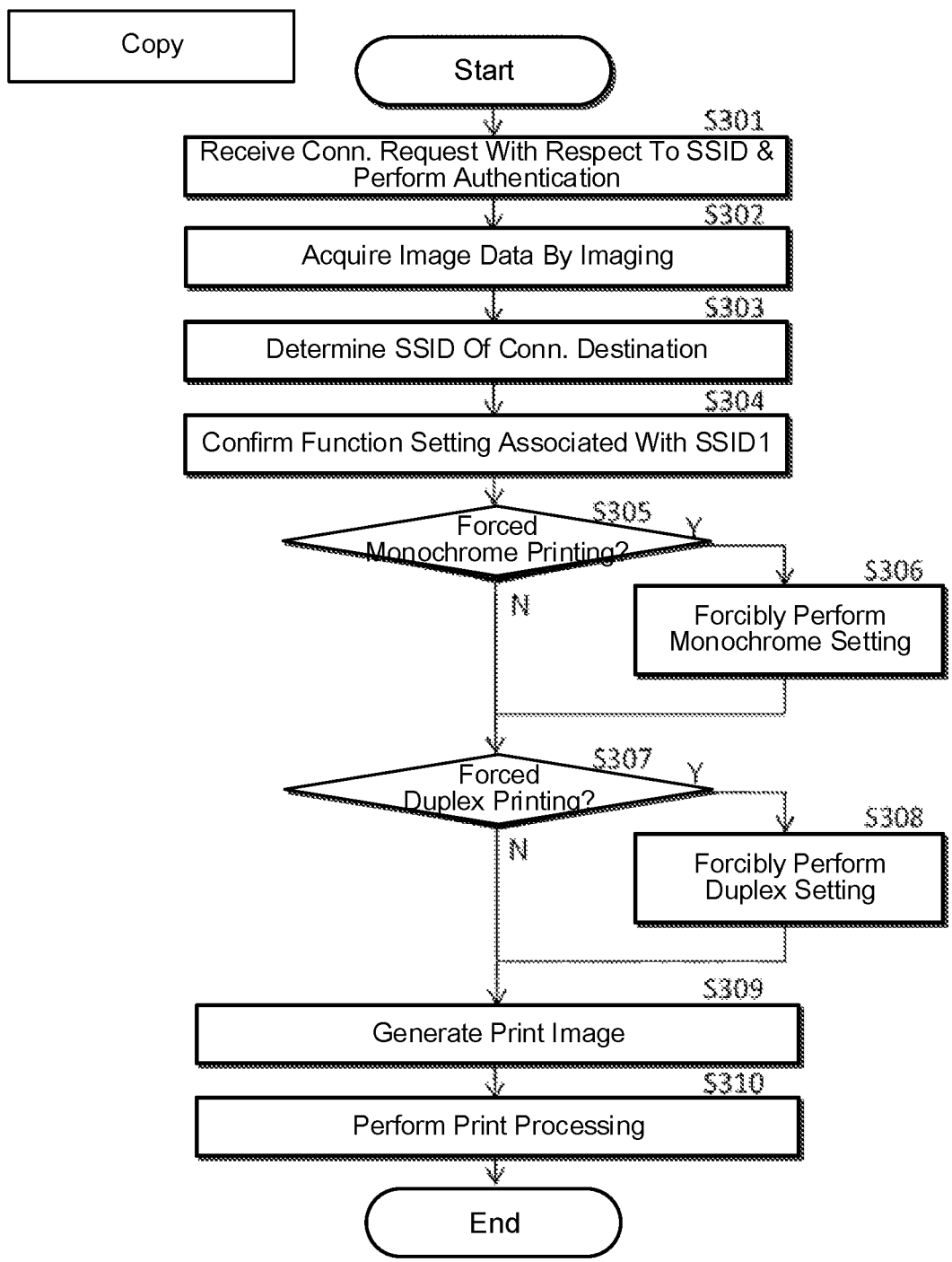
FIG. 9 illustrates an example of an operation when copying is performed.

FIG. 9 illustrates an example of an operation when printing is performed in the copying machine 50. First, a user 100a opens a Wi-Fi setting screen on a mobile terminal 20A and turns on Wi-Fi. Next, the user 100a selects SSID1 (C841_ColorPrint_FA520A) of the copying machine 50 from a list in the mobile terminal 20A, and then inputs a key (password) of SSID1 and presses a "Transmit button." Then, the mobile terminal 20A transmits a connection request including SSID1 and the key (password) (that is, a "connection request with respect to SSID1") to the copying machine 50 via the network 30.

The copying machine 50 (communication part 11) receives the connection request with respect to SSID1 from the mobile terminal 20A and performs authentication (S301). For example, when the connection request with respect to SSID1 is received from the mobile terminal 20A, the copying machine 50 (communication part 11) extracts an SSID and a key (password) included in the received connection request, and performs authentication based on the extracted SSID and key (password). As a result, when the authentication is successful, the communication part 11 may transmit a connection permission as a response to the output connection request to the mobile terminal 20 that made the connection request. In this case, it is also possible that the operation panel part 16 asks the user for a connection permission, and, when the user inputs a connection permission, the communication part 11 transmits the connection permission as a response to the output connection request to the mobile terminal 20 that made the connection request. In this way, by transmitting the connection permission to the mobile terminal 20, Wi-Fi Direct communication between the communication part 11 and the mobile terminal 20A which is the transmission destination of the connection permission is established.

When the mobile terminal 20A receives the above-described connection permission and establishes Wi-Fi Direct communication with the copying machine 50 (communication part 11), the user 100a acquires image data with the scanner part 51 by imaging (S302). For example, after Wi-Fi Direct communication is established, the user 100a places a predetermined sheet of paper on the scanner part 51 and scans the placed predetermined sheet of paper with the scanner part 51. As a result, the scanner part 51 acquires image data. The scanner part 51 outputs the acquired image data to the control part 52. After that, the user 100a launches an application for instructing copying, and uses the launched application to transmit a copy job including SSID1 to the copying machine 50 (communication part 11).

The copying machine 50 (communication part 11) receives the copy job via Wi-Fi Direct (that is, via the network 30). The connection SSID determination part 14 analyzes the copy job input from the mobile terminal 20A with which communication has been established. The connection SSID determination part 14 determines an SSID of a connection destination (Conn. Destination in the drawing) based on the copy job (S303). For example, the connection SSID determination part 14 determines the SSID of the connection destination by extracting SSID1 included in the copy job. For example, the connection SSID determination part 14 outputs the extracted SSID1 to the access control part 15.

The access control part 15 confirms a function setting associated with SSID1 input from the connection SSID determination part 14 (S304). For example, when an SSID is input from the connection SSID determination part 14, the access control part 15 reads a function setting set for the input SSID from the access control setting table 13A of the storage part 12. Further, the access control part 15 determines a function setting with respect to a copy job based on a function setting read from the access control setting table 13A of the storage part 12 and the print setting information read from the storage part 12.

The access control part 15 determines whether or not forced monochrome printing is set in the function setting read from the access control setting table 13A (S305). As a result, when forced monochrome printing is set, the access control part 15 forcibly performs a monochrome setting regardless of the print setting information set in the storage part 12 (S306). When forced monochrome printing is not set, the access control part 15 performs setting for color printing or monochrome printing based on the print setting information set in storage part 12.

Further, the access control part 15 determines whether or not forced duplex printing is set in the function setting read from the access control setting table 13A (S307). As a result, when forced duplex printing is set, the access control part 15 forcibly performs a duplex setting regardless of the print setting information set in the storage part 12 (S308). When forced duplex printing is not set, the access control part 15 performs setting for duplex printing or simplex printing based on the print setting information set in storage part 12.

The access control part 15 outputs the function setting generated in this way to the control part 52. The control part 52 outputs to the printing part 17 a function setting acquired from the access control part 15, a copy job acquired via the communication part 11 from a mobile terminal 20, and image data obtained by the scanner part 51. The printing part 17 generates a print image based on the function setting input from the control part 52, the copy job acquired from the mobile terminal 20 via the communication part 11, and image data obtained by the scanner part 51 (S309). The printing part 17 performs print processing using the generated print image (S310). That is, for example, the printing part 17 performs image processing (no forced monochrome printing and no forced duplex printing) corresponding to SSID1 (C841_ColorPrint_FA520A) with respect to image data, and thereby, outputs an image (first image) corresponding to the image data after the image processing to a sheet of paper of the like. Further, for example, the printing part 17 performs image processing (no forced monochrome printing and no forced duplex printing) corresponding to SSID2 (C841_MonoDuplex_FA520A) with respect to image data, and thereby, outputs an image (second image having an output result different from that of the first image) corresponding to the image data after the image processing to a sheet of paper of the like. In this way, printing in the copying machine 50 is performed.

[Effects]

Next, an effect of the copying machine 50 is described.

Conventionally, an image processing apparatus, such as a printer, a scanner, a copying machine, a facsimile, or a multifunction machine that integrates functions of these apparatuses, that can receive a job from an external device such as a mobile terminal using a communication function such as Wi-Fi Direct and can execute copying, printing, scanning, or the like has been on the market. However, for communication using an external device, it may be desirable to perform a function setting related to a job such as an access restriction (for example, color printing prohibition, forced screen printing, or the like) or the like. In this case, it is necessary to install a dedicated application for performing a function setting related to a job on an external device, and this is complicated.

On the other hand, in the present embodiment, multiple SSIDs and functions related to image processing that are respectively associated with the multiple SSIDs are set in an access control setting table 13A in the storage part 12. As a result, when an image processing job (for example, a copy job) is acquired via the communication part 11 from a mobile terminal 20 with which communication has been established, image data can be processed based on a function related to image processing that is associated with an SSID used to establish the communication. As a result, a function setting related to an image processing job (for example, a copy job) can be easily performed for a mobile terminal 20 without installing a dedicated application for performing a function setting related to an image processing job (for example, a copy job).

Further, in the present embodiment, interfaces for setting functions related to image processing that are respectively associated with multiple SSIDs are respectively provided for the SSIDs, and, in each of the interfaces, an identifier including a character string corresponding to a content input as a setting of a function related to image processing is set as the corresponding SSID. As a result, from a character string of an SSID, a user can infer a function related to image processing corresponding to the SSID. Further, when a Wi-Fi setting screen is opened on a mobile terminal 20A, available SSIDs for a group to which the user belongs can be easily found from an SSID list.

Further, in the present embodiment, in each of the interfaces, when an input that allows processing corresponding to a function related to image processing is made, an identifier including a character string related to the function is set as the corresponding SSID, and when an input that disallows processing corresponding to a function related to image processing is made, an identifier in which a character string related to the function related to image processing is omitted is set as the corresponding SSID. As a result, from a character string of an SSID, a user can infer a function related to image processing corresponding to the SSID. Further, when a Wi-Fi setting screen is opened on a mobile terminal 20A, available SSIDs for a group to which the user belongs can be easily found from an SSID list.

Further, in the present embodiment, an interface for setting a function related to image processing and an SSID is provided for each SSID, and a character string input as a setting of an SSID is set as the corresponding SSID in each interface. As a result, a user can select a character string that is easy for the user to identify as a character string of an SSID. Therefore, when a Wi-Fi setting screen is opened on a mobile terminal 20A, available SSIDs for a group to which the user belongs can be easily found from an SSID list.

Further, in the present embodiment, the scanner part 51 that acquires image data by imaging is provided. Further, when a copy job is acquired as an image processing job via the communication part 11, the image data obtained by the scanner part 51 and a function setting related to image processing are output from the control part 52 to the printing part 17. As a result, based on the function setting input from the control part 52, print processing using the image data can be performed. As a result, even when a copy job does not include a function setting related to image processing, for example, print processing based on a function setting corresponding to a group of the transmission source of the copy job can be performed.

3. Third Embodiment

[Configuration]

Figure 10:
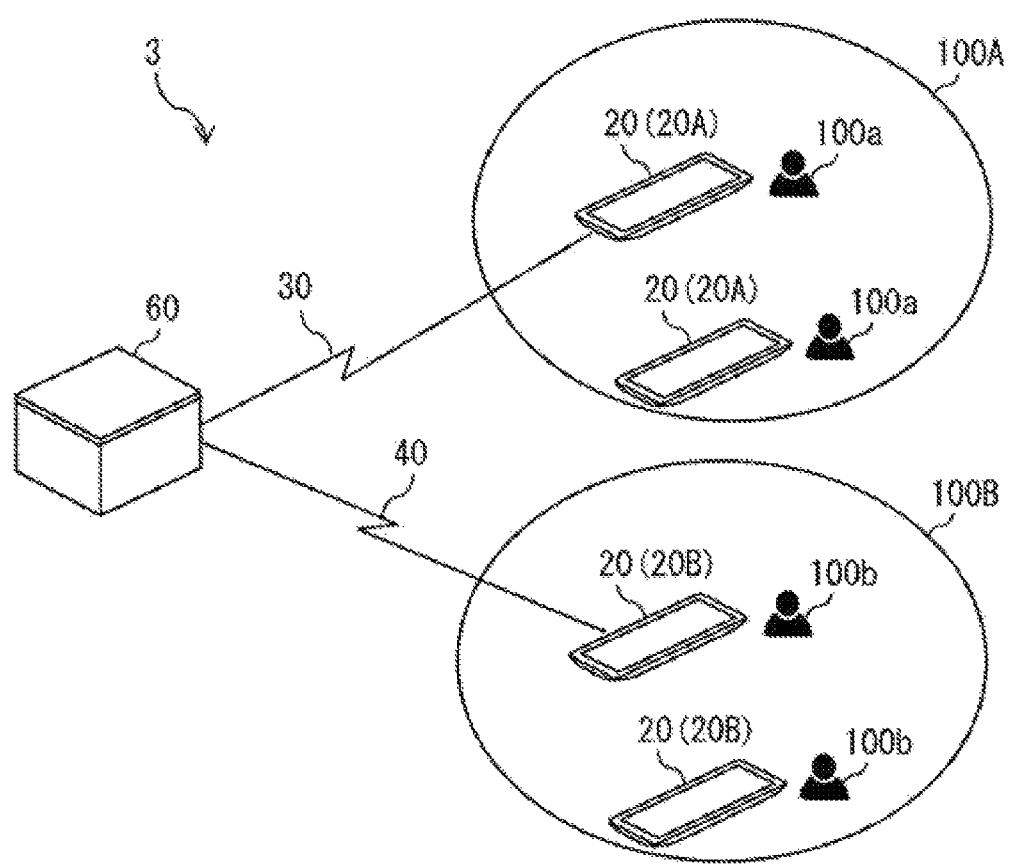
FIG. 10 illustrates a schematic configuration example of an image processing system having a scanner according to a third embodiment of the present invention.

FIG. 10 illustrates a schematic configuration example of an image processing system 3 having a scanner 60 according to an embodiment of the present invention. The image processing system 3 includes the scanner 60 and multiple mobile terminals 20. The scanner 60 corresponds to a specific example of an "image processing apparatus" of the present invention. The scanner 60 and each of the mobile terminals 20 are connected to each other via a network 30 or a network 40. The scanner 60 is a Wi-Fi Direct compatible image data generation device.

The network 30 is a network for connecting the scanner 60 and a mobile terminal 20 (20A) used by a user 100a belonging to a first group 100A to each other by Wi-Fi Direct. The network 40 is a network for connecting the scanner 60 and a mobile terminal 20 (20B) used by a user 100b belonging to a second group 100B to each other by Wi-Fi Direct. Here, the first group 100A and the second group 100B are different from each other in types of scan functions available in the scanner 60. The first group 100A is, for example, a group for which no restriction is imposed with respect to the scan functions in the scanner 60. On the other hand, the second group 100B is, for example, a group for which restrictions are imposed with respect to the scan functions in the scanner 60.

(Scanner 60)

Figures 11, 12:
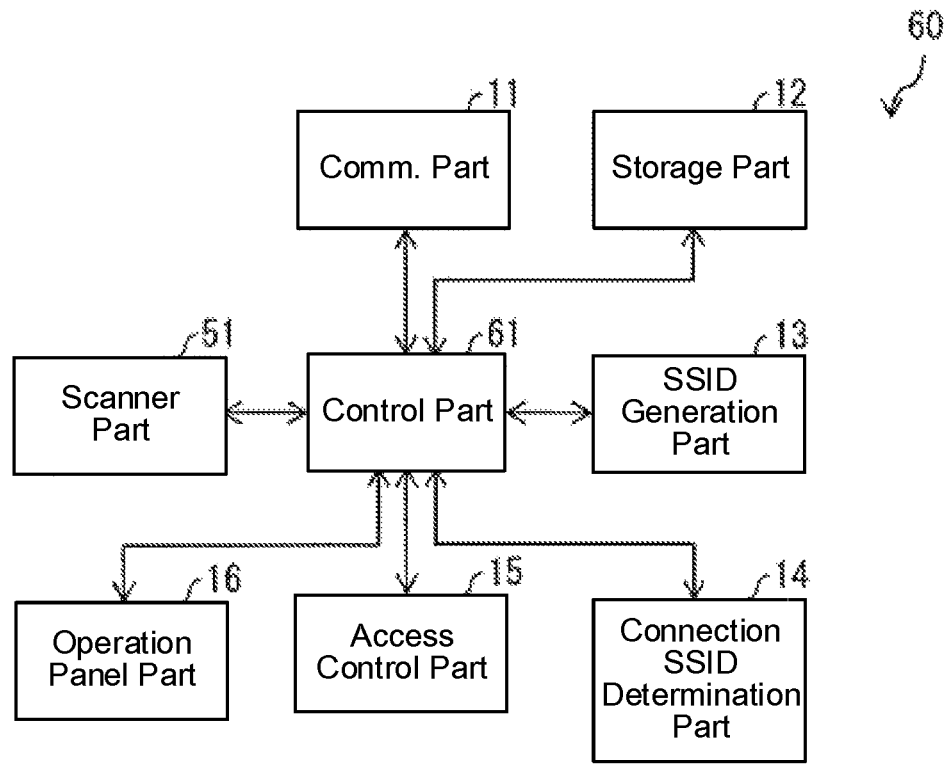
FIG. 11 illustrates an example of functional blocks of the scanner.
FIG. 12 illustrates an example of an access restriction setting table.

FIG. 11 illustrates an example of functional blocks of the scanner 60. The scanner 60 acquires image data by imaging and processes the acquired image data to generate image data for transmission. The scanner 60 outputs the generated image data for transmission to outside as needed. The scanner 60 includes, for example, a communication part 11, a storage part 12, an SSID generation part 13, a connection SSID determination part 14, an access control part 15, an operation panel part 16, a scanner part 51, and a control part 61. The scanner part 51 corresponds to a specific example of a "data processing part" of the present invention. The control part 61 corresponds to a specific example of a "control part" of the present invention. In the following, a configuration that is the same as in the above embodiment is denoted using the same reference numeral symbol as in the above embodiment. Further, in the following, description about a configuration that is the same as in the above embodiment is omitted as appropriate.

The communication part 11, the storage part 12, the SSID generation part 13, the connection SSID determination part 14, the access control part 15, the operation panel part 16, the scanner part 51 and the control part 61 may be configured using, for example, hardware (circuits). At least some of the SSID generation part 13, the connection SSID determination part 14, the access control part 15 and the control part 61 may be configured using software (programs). In this case, a program for causing a computer to execute a function may be installed in the computer in advance and used, or may be installed in the computer from a network or a recording medium and used.

The communication part 11 is a communication interface that performs communication with one or more mobile terminals 20 by Wi-Fi Direct (that is, via the network 30 or the network 40). The communication part 11 performs communication by Wi-Fi Direct with a mobile terminal 20 with which communication associated with at least one of multiple SSIDs (Service Set Identifiers) described in an access control setting table 13B (to be described later) has been established.

When an image processing job is acquired from a mobile terminal 20 with which communication has been established, the communication part 11 outputs the acquired image processing job to the control part 61. In the present embodiment, an image processing job is a scan job that includes an SSID. When a scan job is received from a mobile terminal 20 with which communication has been established, the communication part 11 outputs the received scan job to the control part 61.

The storage part 12 stores an access control setting table 13B generated by the SSID generation part 13. In the access control setting table 13B, for example, as illustrated in FIG. 12, multiple SSIDs, and functions related to image processing that are respectively associated with the multiple SSIDs are set. In the present embodiment, the functions related to image processing are functions related to scan processing. The functions related to scan processing include, for example, a resolution function and a function of having or having no character recognition. The storage part 12 stores, for example, a model name (for example, S123) of the scanner 60, a MAC address (for example, 6 characters (AB33CA) from the 4th octet to the 6th octet of the MAC address of the scanner 60), scan setting information, and the like. The scan setting information is information set by default without distinction of a job transmission source, or information set by a user without distinction of a job transmission source. The scan setting information includes, for example, information about a sheet size, a scan orientation, a scan mode (color scan, or monochrome scan), quality (high resolution, medium resolution, or low resolution), character recognition (with character recognition or without character recognition), and the like.

In the access control setting table 13B, a character string suggesting a function related to image processing is set for each SSID as a name of the each SSID to be displayed on a mobile terminal 20. A "function related to image processing" is image processing different from cryptic processing of wireless communication, and is image processing performed with respect to unencrypted image data. For example, in the access control setting table 13B, when two SSIDs (SSID1 and SSID2) are set, a character string S123_HiResoOct_AB33CA is set for SSID1, and a character string S123_LoResoNonOct_AB33CA is set for SSID2. "SSID1" and "S123_HiResoOct_AB33CA" correspond to a specific example of a "first identification name" of the present invention. "SSID2" and "S123_LoResoNonOct_AB33CA" correspond to a specific example of a "second identification name" of the present invention.

Further, in the access control setting table 13B, for example, forced low resolution scanning and forced character recognition scanning are set as functions related to image processing. The forced low resolution scanning means that, when scan setting information set by default or scan setting information set by a user is stored in the storage part 12, regardless of the content of the scan setting information, low resolution scanning is forcibly set. The forced character recognition scanning means that, when scan setting information set by default or scan setting information set by a user is stored in the storage part 12, regardless of the content of the scan setting information, character recognition scanning is forcibly set.

For example, in the access control setting table 13B, when the two SSIDs (SSID1 and SSID2) are set, it is set not to perform forced low resolution scanning (for example, "NO") for SSID1, and it is set to perform forced low resolution scanning (for example, "YES") for SSID2. Further, for example, in the access control setting table 13B, when the two SSIDs (SSID1 and SSID2) are set, it is set to perform forced character recognition scanning (for example, "YES") for SSID1, and it is set to not perform forced character recognition scanning (for example, "NO") for SSID2.

A character string set for an SSID suggests functions available for the SSID. In the character string (A123_HiResoOct_AB33CA) set for SSID1, "A123" is the model name of the scanner 60; "HiReso" means that there is no restriction for low resolution scanning (that is, it is high resolution scanning); "Oct" means that there is no restriction for character recognition (that is, character recognition is allowed); and "AB33CA" are the 6 characters from the 4th octet to the 6th octet of the MAC address of the scanner 60. On the other hand, in the character string (A123_LoResoNonOct_AB33CA) set for SSID2, "A123" is the model name of the scanner 60; "LoReso" means that there is a restriction for low resolution scanning (that is, it is low resolution scanning); "NonOct" means that there is a restriction for character recognition (that is, character recognition is not allowed); and "AB33CA" are the 6 characters from the 4th octet to the 6th octet of the MAC address of the scanner 60.

The SSID generation part 13 causes a user to set multiple SSIDs and functions related to image processing that are respectively associated with the multiple SSIDs, and stores the content set by the user in the storage part 12 as an access control setting table 13B. The SSID generation part 13 generates, for example, screen data for causing a user to set multiple SSIDs and functions related to image processing that are respectively associated with the multiple SSIDs, and outputs the screen data to the operation panel part 16. The SSID generation part 13 generates, for example, screen data for causing a user to set a function related to image processing for each SSID and outputs the screen data to the operation panel part 16.

Figure 13:
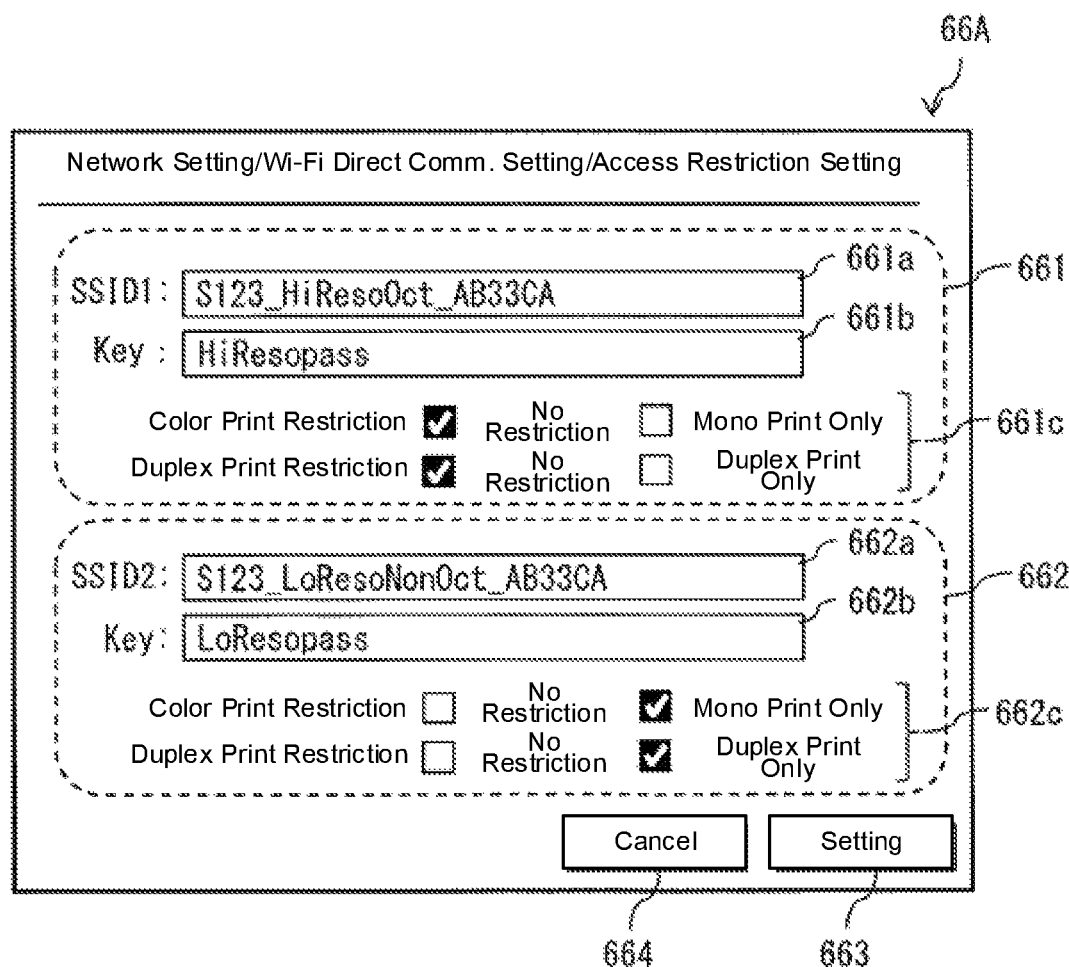
FIG. 13 illustrates an example of a screen when a function related to image processing is set.

Based on the screen data input from SSID generation part 13, the operation panel part 16 displays, for example, a screen 66A (interface) as illustrated in FIG. 13. In the screen 66A, an interface 661 is provided for SSID1 and an interface 662 is provided for SSID2. In the screen 66A, further, a button (setting button 663) for setting an input content and a button (cancel button 664) for canceling an input content are provided.

In the interface 661, for example, a window 661a for inputting a character string of SSID1, a window 661b for inputting a key (password) corresponding to SSID1, and a window 661c for selecting a function related to image processing associated with SSID1 are provided. FIG. 13 illustrates a state in which a character string of SSID1 is input in the window 661a, and a key (password) corresponding to SSID1 is input in the window 661b. Further, FIG. 13 illustrates a state in which, as functions related to image processing, resolution restriction and character recognition restriction are described, "No restriction" is selected for the resolution restriction, and "No restriction" is selected for the character recognition restriction.

Similarly, in the interface 662, for example, a window 662a for inputting a character string of SSID2, a window 662b for inputting a key (password) corresponding to SSID2, and a window 662c for selecting a function related to image processing associated with SSID2 are provided. FIG. 13 illustrates a state in which a character string of SSID2 is input in the window 662a, and a key (password) corresponding to SSID2 is input in the window 662b. Further, FIG. 13 illustrates a state in which, as functions related to image processing, resolution restriction and character recognition restriction are described, "Low resolution only" is selected for the resolution restriction, and "No character recognition" is selected for the character recognition restriction.

The operation panel part 16 outputs to the SSID generation part 13 the content input by the user as a function setting in the above interfaces (for example, the interfaces 661, 662). The SSID generation part 13 generates an identifier including a character string corresponding to the content input from the operation panel part 16, and sets the generated identifier as the corresponding SSID.

In the above interfaces (for example, the interfaces 661, 662), when an input that allows processing corresponding to a function related to image processing is made, the SSID generation part 13 sets an identifier including a character string related to the allowed function as the corresponding SSID. Further, in the above interfaces (for example, the interfaces 661, 662), when an input that disallows processing corresponding to a function related to image processing is made, the SSID generation part 13 sets an identifier in which a character string related to the disallowed function is omitted as the corresponding SSID.

In the above interfaces (for example, the windows 661a, 662a of the interfaces 661, 662), when an SSID is manually input by a user, the operation panel part 16 may set as the corresponding SSID a character string input by the user.

The SSID generation part 13 outputs a set SSID to the operation panel part 16. The operation panel part 16 displays the SSID input from the SSID generation part 13 in the window 661a or the window 662a. In this case, the operation panel part 16 may display the SSID in the window 661a or the window 662a in a mode in which the SSID displayed in the window 661a or the window 662a can be modified by a user. The operation panel part 16 may also display the SSID in the window 661a or the window 662a in a mode in which the SSID displayed in the window 661a or the window 662a cannot be modified by a user.

When the setting button 663 is selected by a user, the operation panel part 16 outputs the multiple SSIDs input in the window 661a and the window 662a, the multiple keys (passwords) input in the window 661b and the window 662b, and the functions related to image processing input in the window 661c and the window 662c to the SSID generation part 13. The SSID generation part 13 stores the content input from the operation panel part 16 as an access control setting table 13B in the storage part 12. Specifically, the SSID generation part 13 stores, as an access control setting table 13B in the storage part 12, the multiple SSIDs that are set with the operation panel part 16 and the functions related to image processing that are input with the operation panel part 16 and are respectively associated with the multiple SSIDs. In this way, the SSID generation part 13 and the operation panel part 16 set the multiple SSIDs and the functions related to image processing that are respectively associated with the multiple SSIDs.

The connection SSID determination part 14 analyzes an image processing job input from a mobile terminal 20. For example, when a scan job is input from the control part 61, the connection SSID determination part 14 extracts an SSID included in the scan job and outputs the extracted SSID to the access control part 15.

The access control part 15 confirms a function setting associated with the SSID input from the connection SSID determination part 14. For example, when an SSID is input from the connection SSID determination part 14, the access control part 15 reads a function setting set for the input SSID from the access control setting table 13B of the storage part 12. The access control part 15 further determines a function setting for the image processing job based on the function setting read from the access control setting table 13B of the storage part 12 and the scan setting information read from the storage part 12. For example, the access control part 15 determines a function setting for the scan job based on the function setting read from the access control setting table 13B of the storage part 12 and the scan setting information read from the storage part 12.

It is assumed that "NO" for forced low resolution scanning and "NO" for forced character recognition scanning are set in the function setting read from the access control setting table 13B of the storage part 12. Further, it is assumed that high resolution scanning and character recognition scanning are set in the scan setting information set in the storage part 12. In this case, the access control part 15 may generate a function setting in which high resolution scanning is set for the resolution scanning setting by giving priority to the scan setting information set in the storage part 12, and character recognition scanning is set for the character recognition scanning setting by giving priority to the function setting input from the control part 61. The access control part 15 may output the function setting generated in this way to the control part 61.

The scanner part 51 acquires image data by imaging based on a function setting input from the control part 61, and processes the acquired image data to generate image data for transmission.

For example, it is assumed that a setting in which "NO" for forced low resolution scanning and "YES" for forced character recognition scanning are set as a function setting is input to the scanner part 51. Further, it is assumed that high resolution scanning and character recognition scanning are set in the scan setting information set in the storage part 12. In this case, the scanner part 51 sets high resolution scanning for the resolution scanning setting by giving priority to the scan setting information set in the storage part 12, and sets character recognition scanning for the character recognition scanning setting by giving priority to the function setting input from the control part 61. The scanner part 51 may acquire image data by imaging under such a setting and process the acquired image data to generate image data for transmission.

The scanner part 51 outputs the generated image data for transmission to the communication part 11. The communication part 11 transmits the image data for transmission input from the scanner part 51 to a mobile terminal 20 with which communication has been established.

The control part 61 acquires via the communication part 11 an image processing job from a mobile terminal 20 with which communication has been established. For example, the control part 61 acquires via the communication part 11 a scan job from a mobile terminal 20 with which communication has been established.

The control part 61 outputs a received image processing job to the connection SSID determination part 14. The control part 61 acquires from the access control part 15 a function setting associated with an SSID included in an image processing job output to the connection SSID determination part 14 as a response to the image processing job. For example, the control part 61 outputs a received scan job to the connection SSID determination part 14. For example, the control part 61 acquires from the access control part 15 a function setting associated with an SSID included in a scan job output to the connection SSID determination part 14 as a response to the scan job.

The control part 61 outputs to the scanner part 51 a function setting acquired from the access control part 15 and an image processing job acquired via the communication part 11 from a mobile terminal 20. When the image processing job is a scan job, the control part 61 outputs to the scanner part 51 a function setting acquired from the access control part 15 and a scan job acquired via the communication part 11 from a mobile terminal 20.

[Operation]

Next, an example of a function setting related to image processing in the scanner 60 is described.

FIG. 14 illustrates an example of an operation when a function related to image processing is set. First, a user calls a function setting screen related to image processing via the operation panel part 16. Then, the SSID generation part 13 generates, for example, screen data for causing a user to set multiple SSIDs and functions related to image processing that are respectively associated with the multiple SSIDs, and outputs the screen data to the operation panel part 16. The SSID generation part 13 generates, for example, screen data for causing a user to set a function related to image processing for each SSID and outputs the screen data to the operation panel part 16. For example, based on the screen data input from the SSID generation part 13, the operation panel part 16 displays an interface (function setting screen) for causing a user to set multiple SSIDs and functions related to image processing that are respectively associated with the multiple SSIDs.

Next, the SSID generation part 13 acquires a model name of the scanner 60 from the storage part 12 (S401). The SSID generation part 13 temporarily stores the acquired model name in Parameter % MODEL % (S402). In this case, the user inputs processing corresponding to a function related to image processing in the interface (function setting screen). For example, the user inputs functions related to image processing in the windows 661c, 662c of the interfaces 661, 662 that are respectively provided for the SSIDs as illustrated in FIG. 13. For example, as illustrated in FIG. 13, in the window 661c of the interface 661, the user selects "No restriction" for the resolution restriction and "No restriction" for the character recognition restriction as a function setting corresponding to SSID1. Further, for example, as illustrated in FIG. 13, in the window 662c of the interface 661, the user selects "Low resolution only" for the resolution restriction and "No character recognition" for the character recognition restriction as a function setting corresponding to SSID2.

Then, the operation panel part 16 acquires the content input by the user as a function setting related to image processing in the above interfaces (for example, the interfaces 661, 662) (S403). The operation panel part 16 outputs the acquired function setting to the SSID generation part 13. The SSID generation part 13 acquires the function setting from the operation panel part 16.

The SSID generation part 13 determines whether or not forced low resolution scanning and forced character recognition scanning are set based on the acquired function setting, and sets parameters according to a result of the determination.

For example, the SSID generation part 13 determines whether or not forced low resolution scanning (Forced Low-Reso. Scanning in the drawing) is set in a function setting corresponding to SSID1 (S404). For example, when "Low resolution only" is set for the resolution restriction in a function setting corresponding to SSID2, the SSID generation part 13 temporarily stores "LoReso" in Parameter % RESO % for SSID2 indicating that forced low resolution scanning is set in the function setting corresponding to SSID2 (S405). Further, for example, when "No restriction" is set for the resolution restriction in a function setting corresponding to SSID1, the SSID generation part 13 temporarily stores "HiReso" in Parameter % RESO % for SSID1 indicating that forced low resolution scanning is not set (S406).

For example, the SSID generation part 13 determines whether or not forced character recognition scanning (Forced Chara-Rec. Scanning in the drawing) is set in a function setting corresponding to SSID1 (S407). For example, when "No character recognition" is set for the character recognition restriction in a function setting corresponding to SSID2, the SSID generation part 13 temporarily stores "NonOct" in Parameter % OCT % for SSID2 indicating that forced character recognition scanning is not set in the function setting corresponding to SSID2 (S408). Further, for example, when "No restriction" is set for the character recognition restriction in a function setting corresponding to SSID1, the SSID generation part 13 temporarily stores "Oct" in Parameter % OCT % for SSID1 indicating that forced character recognition scanning is set (S409).

Next, the SSID generation part 13 acquires 6 characters from the 4th octet to the 6th octet of the MAC address of the scanner 60 from the storage part 12 (S410). The SSID generation part 13 temporarily stores the acquired MAC address in Parameter % MAC % (S411). Based on the parameters obtained this way, the SSID generation part 13 determines an SSID character string (S412). For example, the SSID generation part 13 applies the temporarily stored character string to a character string (% MODEL %_% RESO %_% OCT %_% MA C %) formed by arranging % MODEL %, "_", % RESO %, % OCT %, "_", and % MAC % in a row. As a result, for example, the SSID generation part 13 generates A123_LoResoNonOct_AB33CA as a character string corresponding to SSID1 and A123_HiResoOct_AB33CA as a character string corresponding to SSID2. Finally, the user selects the setting button 663. Then, the SSID generation part 13 stores in the storage part 12 an access control setting table 13B in which a character string of an SSID and a function setting corresponding to the SSID are set for each SSID. That is, for example, the SSID generation part 13 sets first image processing (no forced low resolution scanning and with forced character recognition scanning) as a function related to image processing corresponding to SSID1 (A123_LoResoNonOct_AB33CA) and sets second image processing (with forced low resolution scanning and no forced character recognition scanning) as a function related to image processing corresponding to SSID2 (A123_HiResoOct_AB33CA). In this way, function settings related to image processing are performed. The SSID generation part 13 may also store a key (password) of an SSID in the storage part 12 along with storing an access control setting table 13B in the storage part 12.

Next, an example of an operation when scanning is performed in the scanner 60 is described.

FIG. 15 illustrates an example of an operation when scanning is performed in the scanner 60. First, a user 100*a* opens a Wi-Fi setting screen on a mobile terminal 20A and turns on Wi-Fi. Next, the user 100*a* selects SSID1 (A123_LoResoNonOct_AB33CA) of the scanner 60 from a list in the mobile terminal 20A, and then inputs a key (password) of SSID1 and presses a "Transmit button." Then, the mobile terminal 20A transmits a connection request including SSID1 and the key (password) (that is, a "connection request with respect to SSID1") to the scanner 60 via the network 30.

The scanner 60 (communication part 11) receives the connection request with respect to SSID1 from the mobile terminal 20A and performs authentication (S501). For example, when the connection request with respect to SSID1 is received from the mobile terminal 20A, the scanner 60 (communication part 11) extracts an SSID and a key (password) included in the received connection request, and performs authentication based on the extracted SSID and key (password). As a result, when the authentication is successful, the communication part 11 may transmit a connection permission as a response to the output connection request to the mobile terminal 20 that made the connection request. In this case, it is also possible that the operation panel part 16 asks the user for a connection permission, and, when the user inputs a connection permission, the communication part 11 transmits the connection permission as a response to the output connection request to the mobile terminal 20 that made the connection request. In this way, by transmitting the connection permission to the mobile terminal 20, Wi-Fi Direct communication between the communication part 11 and the mobile terminal 20A which is the transmission destination of the connection permission is established.

When the mobile terminal 20A receives the above-described connection permission and establishes Wi-Fi Direct communication with the scanner 60 (communication part 11), the user 100*a* launches an application for instructing scanning and uses the launched application to transmit a scan job to the scanner 60 (communication part 11).

The scanner 60 (communication part 11) receives the scan job via Wi-Fi Direct (that is, via the network 30) (S502). The connection SSID determination part 14 analyzes the scan job input from the mobile terminal 20A with which communication has been established. The connection SSID determination part 14 determines an SSID of a connection destination (Conn. Destination in the drawing) based on the scan job (S503). For example, the connection SSID determination part 14 determines the SSID of the connection destination by extracting SSID1 included in the scan job. For example, the connection SSID determination part 14 outputs the extracted SSID1 to the access control part 15.

The access control part 15 confirms a function setting associated with SSID1 input from the connection SSID determination part 14 (S504). For example, when an SSID is input from the connection SSID determination part 14, the access control part 15 reads a function setting set for the input SSID from the access control setting table 13B of the storage part 12. Further, the access control part 15 determines a function setting for the scan job based on the function setting read from the access control setting table 13B of the storage part 12 and the scan setting information read from the storage part 12.

The access control part 15 determines whether or not forced low resolution scanning is set in the function setting read from the access control setting table 13B (S505). As a result, when forced low resolution scanning is set, the access control part 15 forcibly performs a low resolution scanning setting regardless of the scan setting information set in the storage part 12 (S506). When forced low resolution scanning is not set, the access control part 15 performs setting for resolution scanning based on the scan setting information set in storage part 12.

Further, the access control part 15 determines whether or not forced character recognition scanning is set in the function setting read from the access control setting table 13B (S507). As a result, when forced character recognition scanning is set, the access control part 15 forcibly performs a character recognition scanning setting regardless of the scan setting information set in the storage part 12 (S508). When forced character recognition scanning is not set, the access control part 15 performs setting for character recognition scanning based on the scan setting information set in storage part 12.

The access control part 15 outputs the function setting generated in this way to the control part 61. The control part 61 outputs to the scanner part 51 a function setting acquired from the access control part 15 and a scan job acquired via the communication part 11 from a mobile terminal 20. Based on the function setting input from the control part 61 and the scan job acquired from the mobile terminal 20 via the communication part 11, the scanner part 51 performs scanning and acquires scan data (image data) (S509). The scanner part 51 outputs the generated scan data (image data) to the control part 61. That is, for example, when scanning is performed, the scanner part 51 performs image processing (no forced low resolution scanning and no forced character recognition scanning) corresponding to SSID1 (A123_LoResoNonOct_AB33CA), and thereby, outputs image data (first image) after the image processing. Further, for example, when scanning is performed, the scanner part 51 performs image processing (with forced low resolution scanning and with forced character recognition scanning) corresponding to SSID2 (A123_HiResoOct_AB33CA), and thereby, outputs image data (second image having an output result different from the first image) after the image processing. The control part 61 transmits the scan data (image data) input from the scanner part 51 to the mobile terminal 20 with which communication has been established (S510). In this way, scanning in the scanner 60 is performed.

[Effects]

Next, an effect of the scanner 60 is described.

Conventionally, an image processing apparatus, such as a printer, a scanner, a copying machine, a facsimile, or a multifunction machine that integrates functions of these apparatuses, that can receive a job from an external device such as a mobile terminal using a communication function such as Wi-Fi Direct and can execute copying, printing, scanning, or the like has been on the market. However, for communication using an external device, it may be desirable to perform a function setting related to a job such as an access restriction (for example, color printing prohibition, forced screen printing, or the like) or the like. In this case, it is necessary to install a dedicated application for performing a function setting related to a job on an external device, and this is complicated.

On the other hand, in the present embodiment, multiple SSIDs and functions related to image processing that are respectively associated with the multiple SSIDs are set in an access control setting table 13B in the storage part 12. As a result, when an image processing job (for example, a scan job) is acquired via the communication part 11 from a mobile terminal 20 with which communication has been established, image data can be processed based on a function related to image processing that is associated with an SSID used to establish the communication. As a result, a function setting related to an image processing job (for example, a scan job) can be easily performed for a mobile terminal 20 without installing a dedicated application for performing a function setting related to an image processing job (for example, a scan job).

Further, in the present embodiment, interfaces for setting functions related to image processing that are respectively associated with multiple SSIDs are respectively provided for the SSIDs, and, in each of the interfaces, an identifier including a character string corresponding to a content input as a setting of a function related to image processing is set as the corresponding SSID. As a result, from a character string of an SSID, a user can infer a function related to image processing corresponding to the SSID. Further, when a Wi-Fi setting screen is opened on a mobile terminal 20A, available SSIDs for a group to which the user belongs can be easily found from an SSID list.

Further, in the present embodiment, in each of the interfaces, when an input that allows processing corresponding to a function related to image processing is made, an identifier including a character string related to the function is set as the corresponding SSID, and when an input that disallows processing corresponding to a function related to image processing is made, an identifier in which a character string related to the function related to image processing is omitted is set as the corresponding SSID. As a result, from a character string of an SSID, a user can infer a function related to image processing corresponding to the SSID. Further, when a Wi-Fi setting screen is opened on a mobile terminal 20A, available SSIDs for a group to which the user belongs can be easily found from an SSID list.

Further, in the present embodiment, an interface for setting a function related to image processing and an SSID is provided for each SSID, and a character string input as a setting of an SSID is set as the corresponding SSID in each interface. As a result, a user can select a character string that is easy for the user to identify as a character string of an SSID. Therefore, when a Wi-Fi setting screen is opened on a mobile terminal 20B, available SSIDs for a group to which the user belongs can be easily found from an SSID list.

Further, in the present embodiment, the scanner part 51 that acquires image data by imaging is provided. Further, when a scan job is acquired as an image processing job via the communication part 11, a function setting related to image processing is output from the control part 61 to the scanner part 51. As a result, scan data can be acquired by imaging based on the function setting input from the control part 61, and image data for transmission can be generated by processing the acquired scan data. As a result, even when a scan job does not include a function setting related to image processing, for example, scan processing based on a function setting corresponding to a group of the transmission source of the scan job can be performed.

In the above, the present disclosure is described by illustrating embodiments. However, the present invention is not limited to these embodiments and the like, and various modifications are possible. The effects described in this specification are merely examples. The effects of the present invention are not limited to the effects described in this specification. The present invention may have effects other than the effects described in this specification.

What is claimed is:

1. An image processing apparatus comprising:
a data processing part that performs image processing of image data;
a setting part that sets multiple wireless communication identifiers and functions related to image processing that are respectively associated with the multiple wireless communication identifiers wherein these wireless communication identifies include a first service set identifier (or first SSID) and a second service set identifier (or second SSID) stored in a storage part, the first SSID being associated with a first function setting set with the setting part and a first Wi-Fi network to which a first external device belongs, and the second SSID being associated with a second function setting set with the setting part and a second Wi-Fi network to which a second external device belongs; and
a communication part that establishes the first Wi-Fi network with the first external device using the first SSID and the second Wi-Fi network with the second external device using the second SSID;
when an image processing job is acquired via the communication part passing through the first Wi-Fi network, the first function setting is transmitted to the data processing part such that the data processing part performs image processing of the image processing job in accordance with the first function setting, and
when the image processing job is acquired via the communication part passing through the second Wi-Fi network, the second function setting is transmitted to the data processing part such that the data processing part performs image processing in accordance with the second function setting.

2. The image processing apparatus according to claim 1, wherein
the setting part provides an interface for setting the function related to image processing for each of the wireless communication identifiers such that a character string corresponding to function is entered through the interface, and the setting part, in each of the interfaces, sets an identifier including the character string as the corresponding wireless communication identifier.

3. The image processing apparatus according to claim 2, wherein
in each of the interfaces, when a setting that allows processing corresponding to the function is made, the setting part sets the identifier including the character string related to the function as the corresponding wireless communication identifier, and
when a setting that does not allow processing corresponding to the function is made, the setting part sets the identifier in which the character string related to the function is omitted as the corresponding wireless communication identifier.

4. The image processing apparatus according to claim 1, wherein
the setting part
provides, for each of the wireless communication identifiers, an interface that allows the function related to the image processing and the wireless communication identifier to be set, and,
in each of the interfaces, sets a character string set as a setting of the wireless communication identifier as the corresponding wireless communication identifier.

5. The image processing apparatus according to claim 1, further comprising:
a control part that controls the data processing part, the setting part and the communication part, wherein
when a print job including the image data is acquired as an as the image processing job via the communication part passing through the first WiFi network, the control part outputs the image data and the first function setting to the data processing part,
the data processing part performs the print processing using the image data input from the control part based on the first function setting input from the control part,
when the print job including the image data is acquired as the image processing job via the communication part passing through the second WiFi network, the control part outputs the image data and the second function setting to the data processing part,
the data processing part performs the print processing using the image data input from the control part based on the second function setting input from the control part.

6. The image processing apparatus according to claim 1, further comprising:
an imaging part that acquires the image data by imaging, and
a control part that controls the data processing part, the setting part, the communication part and the imaging part, wherein
when a copy job is acquired as the image processing job via the communication part passing through the first WiFi network, the control part outputs the image data obtained by the imaging part and the first function setting to the data processing part,
the data processing part performs print processing using the image data obtained by the imaging part based on the first function setting input from the control part,
when the copy job is acquired as the image processing job via the communication part passing through the second WiFi network, the control part outputs the image data obtained by the imaging part and the second function setting to the data processing part, the data processing part performs the print processing using the image data obtained by the imaging part based on the second function setting input from the control part.

7. The image processing apparatus according to claim 1, further comprising:
a control part that controls the data processing part, the setting part and the communication part, wherein
when a scan job is acquired as the image processing job via the communication part passing through the first WiFi network, the control part outputs the first function setting to the data processing part,
the data processing part acquires the image data, based on the first function setting input from the control part, by imaging and processes the acquired image data to generate image data for transmission,
when the scan job is acquired as the image processing job via the communication part passing through the second WiFi network, the control part outputs the second function setting to the data processing part,
the data processing part acquires the image data, based on the second function setting input from the control part, by imaging and processes the acquired image data to generate image data for transmission.

8. The image processing apparatus according to claim 5, wherein
the first and second function settings related to the print processing include functions of color printing and monochrome printing one of which is selectable, and functions of duplex printing and simplex printing one of which is selectable.

9. The image processing apparatus according to claim 5, wherein
the first and second function settings related to the print processing include functions of character recognition and no character recognition one of which is selectable.

10. The image processing apparatus according to claim 1, wherein
the functions related to image processing set by the setting part are image processing that are different from cryptic processing of wireless communication, and
are performed with respect to unencrypted image data.

11. An image processing method comprising:
setting multiple wireless communication identifiers and functions related to image processing that are respectively associated with the multiple wireless communication identifiers wherein these wireless communication identifies include a first service set identifier (or first SSID) and a second service set identifier (or second SSID) stored in a storage part, the first SSID being associated with a first function setting set with the setting part and a first Wi-Fi network to which a first external device belongs, and the second SSID being associated with a second function setting set with the setting part and a second Wi-Fi network to which a second external device belongs;
establishing the first Wi-Fi network with the first external device using the first SSID and the second Wi-Fi network with the second external device using the second SSID; wherein
when an image processing job is acquired via the communication part passing through the first Wi-Fi network, transmitting the first function setting to the data processing part such that the data processing part performs image processing of the image processing job in accordance with the first function setting, and when the image processing job is acquired via the communication part passing through the second Wi-Fi network, transmitting the second function setting to the data processing part such that the data processing part performs image processing in accordance with the second function setting.

12. The image processing method according to claim 11, wherein
the image processing is image processing that is different from cryptic processing of wireless communication, and is image processing that outputs unencrypted image data as the first image and the second image.

13. The image processing method according to claim 11, further comprising:
outputting a first image that is generated by performing the image processing associated with the first function setting, and
outputting a second image that is generated by performing the image processing associated with the second function setting and is different from the first image.

14. An image processing apparatus comprising:
a data processing part that performs image processing of image data;
a setting part that sets multiple wireless communication identifiers and functions related to image processing that are respectively associated with the multiple wireless communication identifiers wherein these wireless communication identifies include a first identifier (or first ID) and a second identifier (or second ID) stored in a storage part, the first ID being associated with a first function setting set with the setting part and a first wireless network to which a first external device belongs, and the second ID being associated with a second function setting set with the setting part and a second wireless network to which a second external device belongs; and
a communication part that establishes the first wireless network with the first external device using the first ID and the second wireless network with the second external device using the second ID;
when an image processing job is acquired via the communication part passing through the first wireless network, the first function setting is transmitted to the data processing part such that the data processing part performs image processing of the image processing job in accordance with the first function setting, and
when the image processing job is acquired via the communication part passing through the second wireless network, the second function setting is transmitted to the data processing part such that the data processing part performs image processing in accordance with the second function setting.

15. The image processing apparatus according to claim 1, wherein
the setting part provides an interface for setting the function related to image processing to the first external device such that a user of the first external device edits the first function setting through the interface,
the interface displays a character string forming the first SSID that is used to establish the first Wi-Fi network, and the character string of the first SSID displayed on the interface is to be changed in correspondence with an edit of the first function setting.

16. The image processing apparatus according to claim 15, wherein
the setting part provides an interface for setting the function related to image processing to the second external device such that a user of the second external device edits the second function setting through the interface,
the interface displays a character string forming the second SSID that is used to establish the second Wi-Fi network, and the character string of the second SSID displayed on the interface is to be changed in correspondence with an edit of the second function setting.

* * * * *